US010000620B2

(12) United States Patent
Kaiho et al.

(10) Patent No.: US 10,000,620 B2
(45) Date of Patent: Jun. 19, 2018

(54) POLYARYLENE SULFIDE RESIN COMPOSITION AND METHOD FOR PRODUCING SAME

(71) Applicant: TORAY INDUSTRIES, INC., Tokyo (JP)

(72) Inventors: Shu Kaiho, Nagoya (JP); Shunsuke Horiuchi, Nagoya (JP); Kenji Ishitake, Nagoya (JP); Koji Yamauchi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 73 days.

(21) Appl. No.: 14/901,322

(22) PCT Filed: Jun. 18, 2014

(86) PCT No.: PCT/JP2014/066157
§ 371 (c)(1),
(2) Date: Dec. 28, 2015

(87) PCT Pub. No.: WO2014/208418
PCT Pub. Date: Dec. 31, 2014

(65) Prior Publication Data
US 2016/0137807 A1    May 19, 2016

(30) Foreign Application Priority Data

Jun. 28, 2013 (JP) ................................ 2013-136271
Jun. 28, 2013 (JP) ................................ 2013-136272
Nov. 20, 2013 (JP) ................................ 2013-239653
Feb. 28, 2014 (JP) ................................ 2014-038600

(51) Int. Cl.
*C08G 75/14* (2006.01)
*C08K 3/08* (2006.01)

(52) U.S. Cl.
CPC ........ *C08K 3/08* (2013.01); *C08K 2003/0862* (2013.01); *C08K 2201/003* (2013.01)

(58) Field of Classification Search
None
See application file for complete search history.

(56) References Cited

U.S. PATENT DOCUMENTS

| 5,869,599 A | 2/1999 | Hay |
| 2013/0008286 A1 | 1/2013 | Yamada |

FOREIGN PATENT DOCUMENTS

| CN | 102372927 | | 3/2012 |
|---|---|---|---|
| EP | 0527055 | * | 2/1993 |
| EP | 1927615 A1 | | 6/2008 |
| JP | 5212240 | | 1/1977 |
| JP | 5765754 | | 4/1982 |
| JP | 58185626 | * | 10/1983 |
| JP | 61213262 | | 9/1986 |
| JP | 01268756 | | 1/1989 |
| JP | 05105757 | | 4/1993 |
| JP | 05163349 | | 6/1993 |
| JP | 05301962 | | 11/1993 |
| JP | 08208849 | | 8/1996 |
| JP | 2006348213 | | 12/2006 |
| JP | 2010064983 | | 3/2010 |
| JP | 2010184964 | | 8/2010 |
| JP | 2010275464 | | 12/2010 |
| JP | 2011173953 | | 9/2011 |
| JP | 2011174033 A | | 9/2011 |
| JP | 2012092315 | | 5/2012 |
| JP | 2014159544 | | 9/2014 |
| WO | 2007034800 | | 3/2007 |
| WO | 2011013686 | | 2/2011 |
| WO | 2011115213 | | 9/2011 |

OTHER PUBLICATIONS

International Search Report for International Application No. PCT/JP2014/066157 dated Sep. 22, 2014.
Chinese Office Action dated Sep. 13, 2016 for Chinese Application No. 201480035693.6, including English translation, 7 pages.
Miyatake, et al. "Selective and Efficient Synthesis of Cyclic Hexakis (thio-1,4-phenylene) through Oxidative Polymerization of Diphenyl Disulfide", Macromolecules, vol. 30, 1997, (pp. 4502-4503).
Zimmerman, et al. "Polymerization of poly (p-phenylene sulfide) from a cyclic precursor" vol. 37, No. 14, Issue 14, 1996 (pp. 3111-3116).
Extended European Search Report for European Application No. 14817449.3, dated Jan. 3, 2017, 7 pages.
Qureshi, N., et al, "Innate approach for fabrication of nickel oxide nanocomposite, in pellet form and their electric properties," Mar. 1, 2013, pp. 79-84, vol. 3(1), Materials Express, XP055330049.
Database WPI Week 201161 Thomson Scientific, London, GB; AN 2011-L32474, 2011, 3 pages.

* cited by examiner

*Primary Examiner* — Tae H Yoon
(74) *Attorney, Agent, or Firm* — RatnerPrestia

(57) ABSTRACT

A polyarylene sulfide resin composition containing nickel microparticles having an average particle diameter of 0.5 to 20 nm is produced by heating a cyclic polyarylene sulfide in the presence of at least one component selected from components (i), (ii) and (iii).

12 Claims, 6 Drawing Sheets

[Fig. 1]
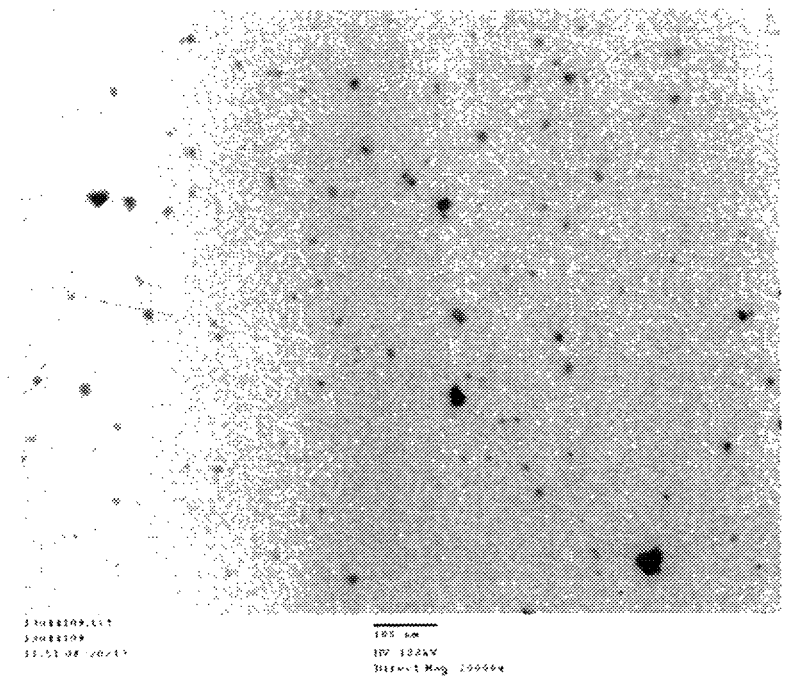
[Fig. 2]
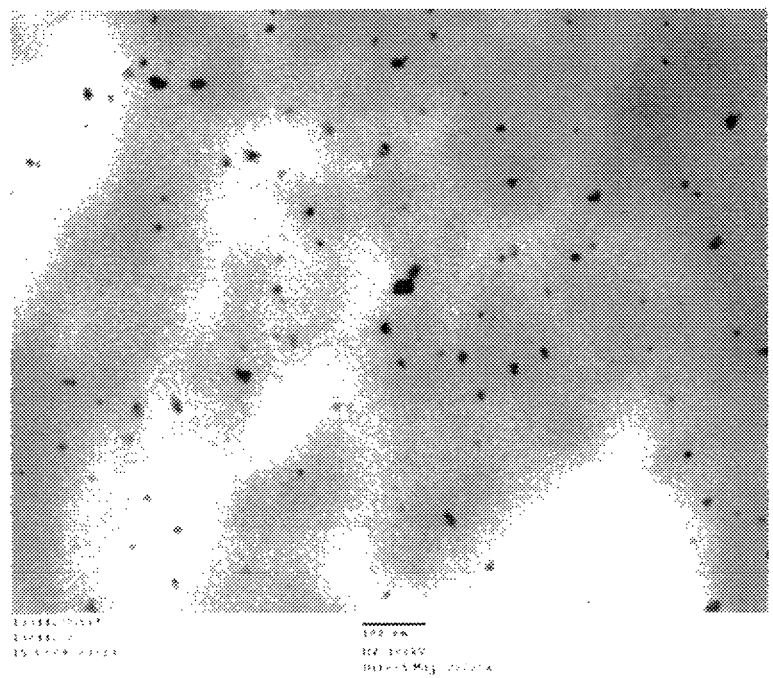

[Fig. 3]
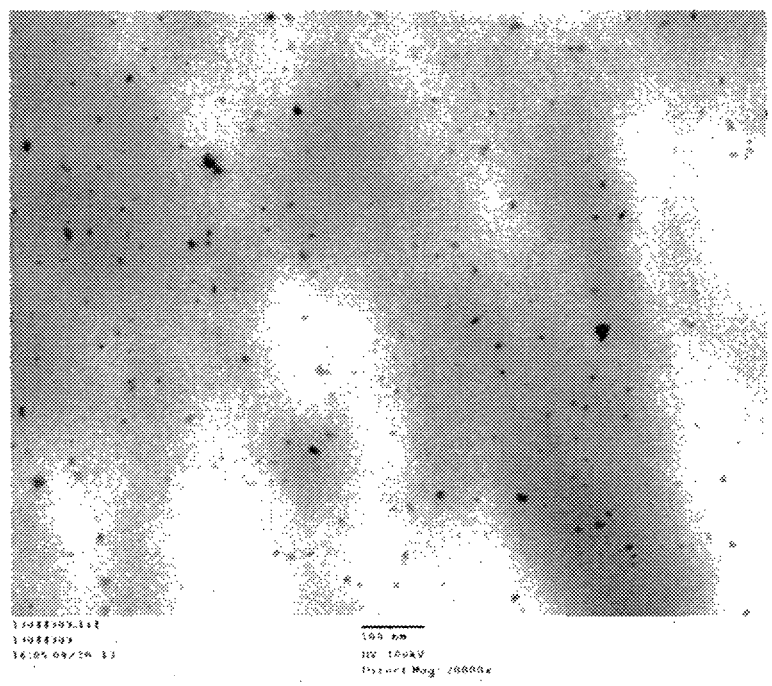
[Fig. 4]
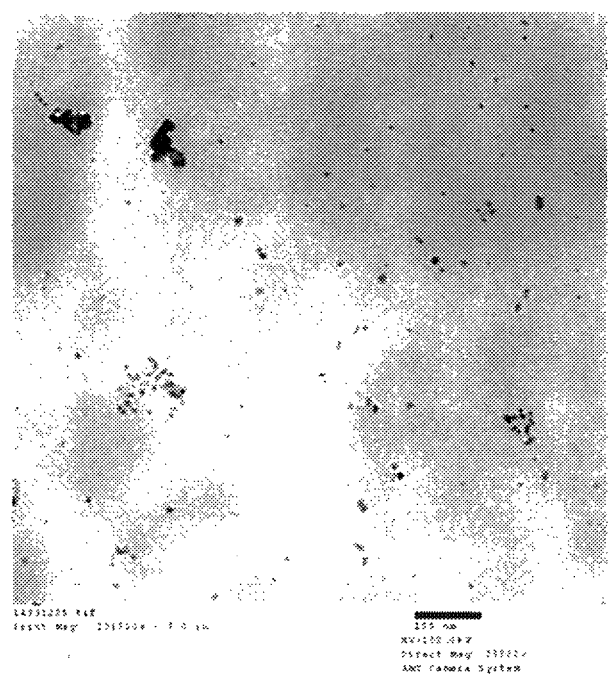

[Fig. 5]
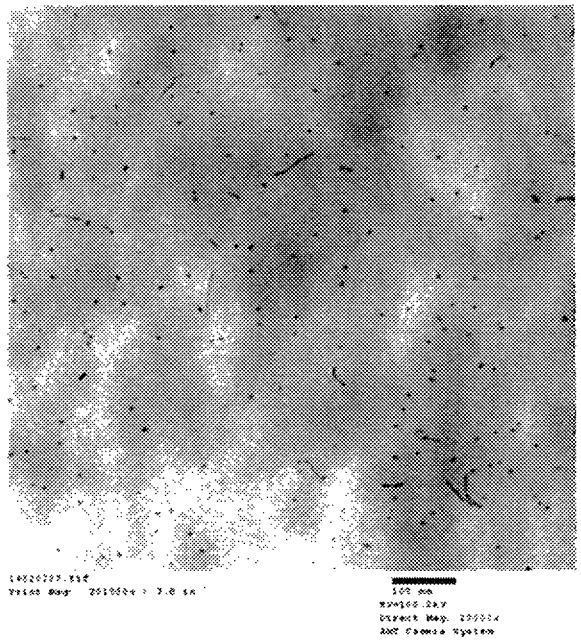
[Fig. 6]
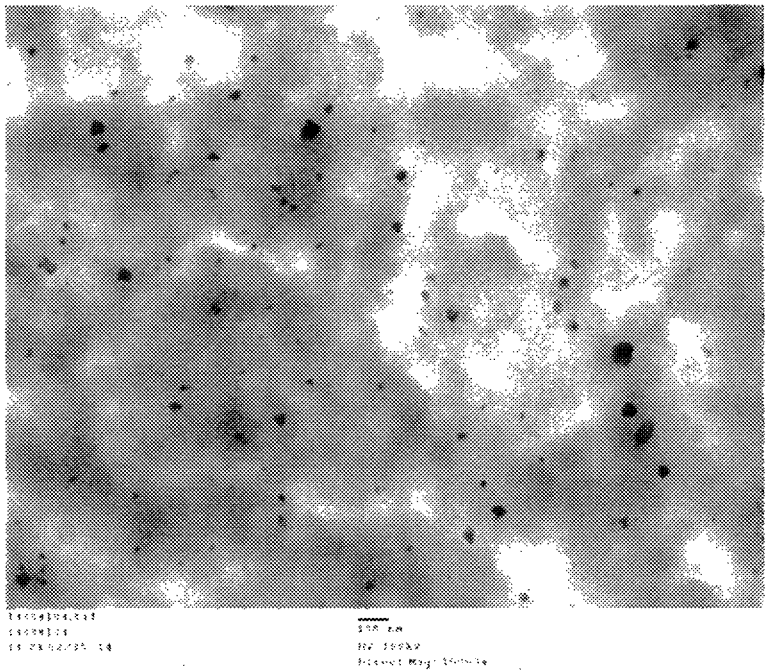

[Fig. 7]
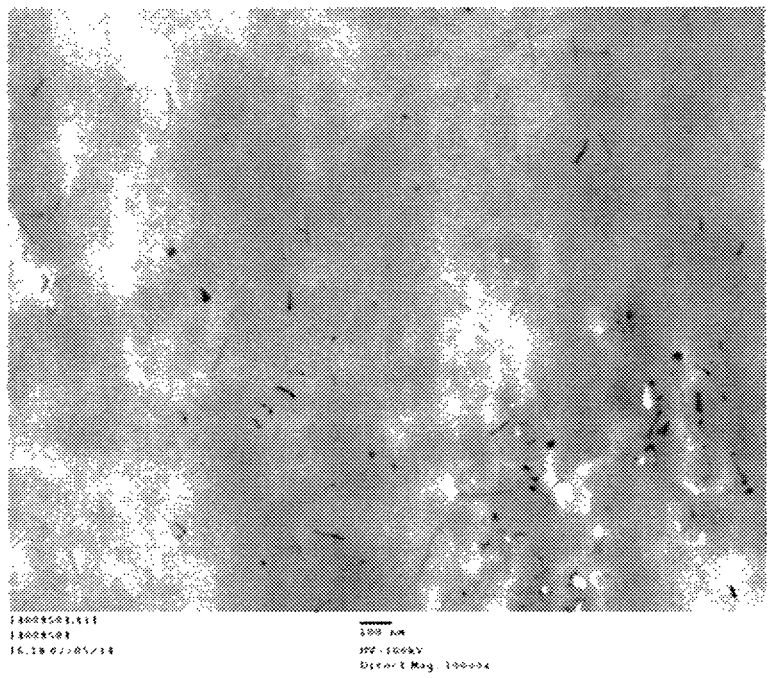
[Fig. 8]
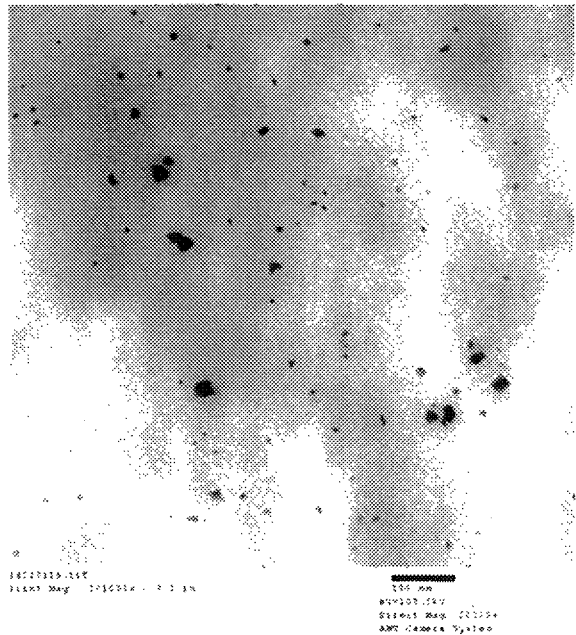

[Fig. 9]
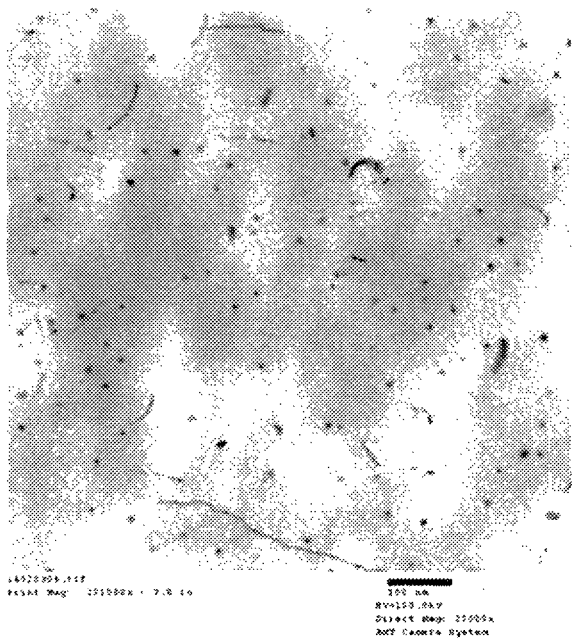
[Fig. 10]
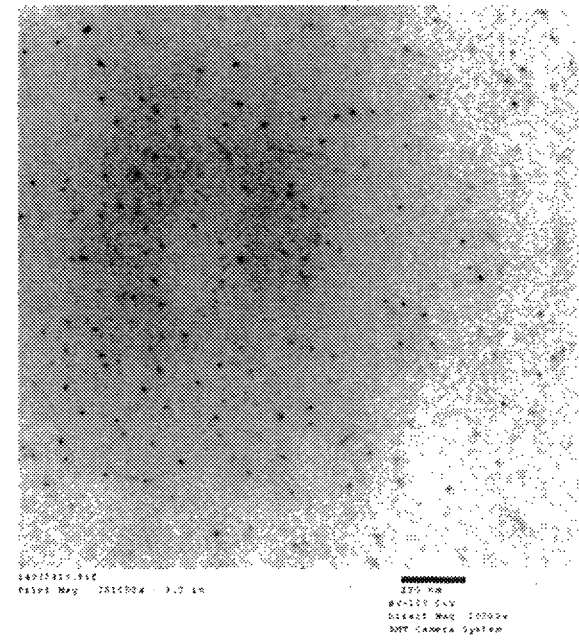

[Fig. 11]
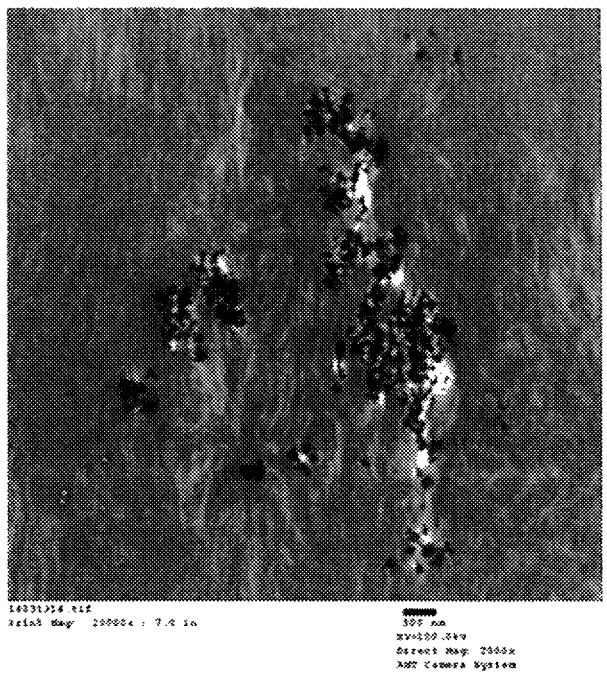

POLYARYLENE SULFIDE RESIN COMPOSITION AND METHOD FOR PRODUCING SAME

CROSS REFERENCE TO RELATED APPLICATIONS

This is the U.S. National Phase application of PCT/JP2014/066157, filed Jun. 18, 2014, which claims priority to Japanese Patent Application Nos. 2013-136271, filed Jun. 28, 2013, 2013-136272, filed Jun. 28, 2013, 2013-239653, filed Nov. 20, 2013, and 2014-038600, filed Feb. 28, 2014, the disclosures of each of these applications being incorporated herein by reference in their entireties for all purposes.

FIELD OF THE INVENTION

The present invention relates to a polyarylene sulfide resin composition including nickel fine particles, and a method for producing the same. More particularly, the present invention relates to a polyarylene sulfide resin composition including nickel fine particles having an average particle size of 0.5 to 20 nm, and a method for producing the same.

BACKGROUND OF THE INVENTION

The polyarylene sulfide typified by polyphenylene sulfide (may be abbreviated as PPS hereinafter) is a resin having properties suitable as engineering plastics, such as excellent heat resistance, barrier property, chemical resistance, electrical resistance property, moist heat resistance and flame resistance. The polyarylene sulfide resin can be molded into various kinds of molded components, films, sheets, fibers and so on by injection molding and extrusion molding, and are widely used in fields where heat resistance and chemical resistance are required, such as those of various kinds of electric and electronic components, mechanical components and automobile components.

However, the polyarylene sulfide resin has the disadvantage of poor toughness while having the above-mentioned properties. A method has been disclosed in which a metal is dispersed in a polyarylene sulfide resin for the purpose of improving toughness. For improvement of toughness, the area of contact between the polyarylene sulfide resin and the metal is preferably large, and thus the metal particles are desired to have a large surface area per mass, i.e. a small particle size.

For example, Patent Document 1 discloses a method for producing a polyarylene sulfide composite material in which an inorganic metal salt is dissolved in a solvent, the resulting solution is mixed with a polyarylene sulfide, the solvent is then removed, and the resulting solid solution or mixture including the polyarylene sulfide and the metal salt is melt-kneaded to reduce the inorganic metal salt to a metal and disperse the metal in the polyarylene sulfide as particles having an average particle size of 0.5 to 30 nm.

Patent Document 2 discloses a plastic composition in which metal fibers of iron, nickel or an iron alloy and a metal powder are filled into and dispersed in a thermoplastic resin for the purpose of imparting conductivity.

Patent Document 3 discloses a resin composition including metal ultrafine particles, or a molded product thereof, and a method for producing the same, the resin composition being produced by heating and molding a mixture of a metal oxide or a metal organic compound and a resin at a temperature equal to or higher than the thermal decomposition initiating temperature of the metal oxide or metal compound and lower than the degradation temperature of the resin to generate metal ultrafine particles having an average particle size of 1 to 100 nm.

Patent Document 4 discloses a method for producing a polyarylene sulfide resin composition with metal element-containing nanoparticles dispersed therein in which a polyarylene sulfide resin and an organic metal compound are dissolved in an organic solvent capable of dissolving a polyarylene sulfide resin, and then precipitated, and Patent Document 5 discloses a method for producing a composite of a polyarylene sulfide resin and inorganic fine particles in which from an organic solvent solution with a polyarylene sulfide resin dissolved and inorganic fine particles dispersed therein, the polyarylene sulfide resin is precipitated. By either of these methods, a polyarylene sulfide resin composition can be produced without performing melt kneading.

As a specific method for producing a polyarylene sulfide, a method has been proposed in which an alkali metal sulfide such as sodium sulfide is reacted with a polyhalogenated aromatic compound such as p-dichlorobenzene in an organic amide solvent such as N-methyl-2-pyrrolidone, and this method is widely used as a method for industrially producing a polyarylene sulfide (e.g. Patent Document 6). However, this production method is a high-energy consumption type which requires carrying out a reaction at a high temperature and a high pressure and under strong alkali conditions, needs an expensive high-boiling-point polar solvent such as N-methyl-2-pyrrolidone, and takes much costs for recovery of the solvent, so that much process costs are required. Further, since a high-boiling-point solvent is used, a solvent-derived gas tends to be easily generated at the time of heating the resulting polyarylene sulfide.

As another method for producing a polyarylene sulfide, which is intended to solve the problems of the methods for producing a polyarylene sulfide as described above, a method for producing a polyarylene sulfide has been disclosed in which a cyclic polyarylene sulfide is heated (e.g. Patent Document 7).

A method for polymerizing polyphenylene sulfide is also known in which a mixture of cyclic polyphenylene sulfide and linear polyphenylene sulfide as a monomer source is heated (Non-Patent Document 1).

As a method for accelerating conversion in conversion of a cyclic polyarylene sulfide to a polyarylene sulfide, a method using various kinds of catalyst components (compound effective to generate radicals, ionic compound, organic carboxylic acid, etc.) is known.

Patent Document 8 and Non-Patent Document 2 each disclose, for example, a compound which generates sulfur radicals when heated, as a compound effective to generate radicals. Specifically, a compound containing a disulfide bond is disclosed.

Patent Documents 9 and 10 each disclose an ionic compound that may serve as a ring-opening polymerization catalyst in anionic polymerization. Specifically, for example, a method using an alkali metal salt of sulfur which generates an anion species such as a sodium thiophenolate is disclosed.

Patent Document 11 discloses a method in which an ionic compound that may serve as a ring-opening polymerization catalyst in anionic polymerization and a Lewis acid are made to coexist. Specifically, a method is disclosed in which a sodium thiophenolate and copper chloride (II) are made to coexist.

A method using a transition metal compound (zero-valent transition metal compound or low-valent iron compound) as a catalyst for accelerating conversion in conversion of a cyclic polyarylene sulfide to a polyarylene sulfide is also known (e.g. Patent Documents 12 and 13).

Specifically, Patent Document 12 discloses a method using, for example, tetrakis(triphenylphosphine) palladium, tetrakis(triphenylphosphine) nickel, or the like as a zero-valent transition metal compound.

Specifically, Patent Document 13 discloses a method using, for example, iron chloride as a low-valent iron compound.

Patent Document 14 discloses a method using a carbanion as an initiator. Specifically, a method using, for example, a sodium 4-chlorophenylacetate or 4-chlorophenylacetic acid is disclosed.

PATENT DOCUMENTS

Patent Document 1: Japanese Patent Laid-open Publication No. 8-208849
Patent Document 2: Japanese Patent Laid-open Publication No. 57-65754
Patent Document 3: Japanese Patent Laid-open Publication No. 2006-348213
Patent Document 4: Japanese Patent Laid-open Publication No. 2010-184964
Patent Document 5: Japanese Patent Laid-open Publication No. 2010-275464
Patent Document 6: Japanese Patent Laid-open Publication No. 52-12240
Patent Document 7: International Publication No. WO 2007/034800
Patent Document 8: U.S. Pat. No. 5,869,599
Patent Document 9: Japanese Patent Laid-open Publication No. 5-163349
Patent Document 10: Japanese Patent Laid-open Publication No. 5-105757
Patent Document 11: Japanese Patent Laid-open Publication No. 5-301962
Patent Document 12: International Publication No. WO 2011/013686
Patent Document 13: Japanese Patent Laid-open Publication No. 2012-92315
Patent Document 14: Japanese Patent Laid-open Publication No. 2011-173953

NON-PATENT DOCUMENTS

Non-Patent Document 1: Polymer, vol. 37, no. 14, 1996 (pages 3111 to 3116)
Non-Patent Document 2: Macromolecules, vol. 30, 1997 (pages 4502 to 4503)

SUMMARY OF THE INVENTION

However, Patent Document 1 does not give any example concerning a polyarylene sulfide resin composition including nickel fine particles. In a solvent removing step, a dissolved metal salt may be coarsely aggregated, and precipitated, leading to existence of remaining coarse particles in a composite material after melt kneading. Further, in a melt kneading operation, degradation, abnormal crosslinking or main chain cleavage of the polyarylene sulfide may occur due to shear heating or air oxidation, and a gas derived from a counter anion component to the metal cation of an inorganic metal salt, or a gas derived from a residual solvent component (chlorine gas for chloride, SOx gas for sulfide, NOx gas for nitride, etc.) may be generated.

Patent Document 2 dose not show a specific example concerning a polyarylene sulfide, and does not give information about the particle size of a metal powder in a plastic composition although the particle size of the metal powder to be filled is described. However, in general, a metal powder tends to easily fall into secondary aggregation in molten plastic, and easily increases in size with respect to the particle size at the time of filling the metal powder.

Patent Document 3 does not show a specific example concerning a polyarylene sulfide, and does not give any example concerning nickel fine particles. For generating metal ultrafine particles in a thermoplastic resin, the thermal decomposition initiating temperature of a metal oxide or metal organic compound must be higher than the melting temperature of the thermoplastic resin, and when a resin excellent in heat resistance, such as a polyarylene sulfide, is used, it is necessary to use a metal oxide or metal organic compound having an extremely high thermal decomposition initiating temperature.

Patent Document 4 does not give any example concerning nickel-containing nanoparticles. Patent Document 5 gives an example in which metal nickel is used as an inorganic fine particle species, but the example shows only cases where the dispersion particle size is larger than 200 nm, and since as compared to the particle size of metal nickel nanoparticles (average primary particle size: 200 nm) used as the inorganic fine particle species, the dispersion particle size thereof in a polyarylene sulfide resin composition increases to 220 nm, and thus it tends to be unable to suppress secondary aggregation, reduction of the particle size of metal nickel nanoparticles to be used as an inorganic fine particle species, i.e. the use of expensive metal nanoparticles, is absolutely necessary for reducing the dispersion particle size. In any of these cases, an expensive high-boiling-point polar solvent such as N-methyl-2-pyrrolidone is used, and in addition, it is preferred to perform heating at a temperature equal to or higher than the boiling point, so that an expensive pressurized vessel is required. Further, an organic solvent may remain in the polyarylene sulfide resin composition.

As described above, convenience and versatility are not sufficient for producing a polyarylene sulfide resin composition including nickel fine particles, the resin may be degraded, a specific example is not shown concerning a polyarylene sulfide resin composition including nickel fine particles having an average particle size of 20 nm or less, and thus production is difficult.

For the method proposed in Patent Document 7, it can be expected to obtain a polyarylene sulfide having a high molecular weight, a narrow molecular weight distribution, and a reduced weight loss in heating, but a high temperature and a long time are required for the reaction of a cyclic polyarylene sulfide to be completed, and therefore a method for producing a polyarylene sulfide at a lower temperature in a shorter time is desired.

The method proposed in Non-Patent Document 1 is an easy and simple method for polymerizing polyphenylene sulfide, but the resulting polyphenylene sulfide has a low polymerization degree, and is not suitable for practical use. This document indicates that the polymerization degree is improved by increasing the heating temperature, but nevertheless, a molecular weight suitable for practical use is not achieved. Further in this case, generation of a crosslinked structure cannot be avoided, and only polyphenylene sulfide having poor thermal properties can be obtained. Thus, a method for polymerizing polyphenylene sulfide which is more suitable for practical use and has high quality is desired.

In the case of the use of the methods proposed in Patent Document 8, Non-Patent Document 2, Patent Document 9 and Patent Document 10, there is the problem that the effect of accelerating conversion of a cyclic polyarylene sulfide to a polyarylene sulfide is insufficient, so that a high temperature and a long time are required for the reaction of the cyclic polyarylene sulfide to be completed.

Patent Document 9 describes a method using a Lewis acid such as iron chloride (III), a proton acid, a trialkyloxonium salt, a carbonium salt, a diazonium salt, an ammonium salt, an alkylating agent, a silylating agent or the like as an ionic compound that may serve as an ring-opening polymerization catalyst in cationic polymerization, but there is no specific disclosure concerning the effect of these ring-opening polymerization catalyst, and the effect is unknown. Further, the mechanism of action of the ring-opening polymerization catalyst in the case of using, for example, iron chloride (III) as the ring-opening polymerization catalyst is also unknown, and there is no specific disclosure concerning a method for adding a catalyst to the cyclic polyarylene sulfide, and polymerization conditions.

In the case of the use of the method proposed in Patent Document 11, there is the problem that the effect of accelerating conversion of a cyclic polyarylene sulfide to a polyarylene sulfide is insufficient, so that a high temperature and a long time are required for the reaction of the cyclic polyarylene sulfide to be completed.

Patent Document 12 describes that when the method described in Patent Document 12 is used, a polyarylene sulfide can be produced at a low temperature in a short time, but there is no description concerning the dispersion state of a transition metal compound.

When the method described in Patent Document 13 is used, a polyarylene sulfide can be produced at a low temperature in a short time, but a method for producing a polyarylene sulfide having a higher polymerization degree is desired. There is no description concerning the dispersion state of a transition metal compound.

When the method described in Patent Document 14 is used, a polyarylene sulfide can be produced at a low temperature in a short time, but a method for producing a polyarylene sulfide at a lower temperature in a shorter time is desired.

Thus, in conversion of a cyclic polyarylene sulfide to a polyarylene sulfide by conventional techniques, the accelerating effect of the catalyst, and enhancement of the polymerization degree of the polyarylene sulfide are not sufficient, and thus a method for producing a polyarylene sulfide having a higher polymerization degree at a lower temperature in a shorter time is desired.

In view of the problems of the polyarylene sulfide resin compositions including nickel fine particles and the methods for producing the same in the above-mentioned background arts, an object of the present invention is to provide a polyarylene sulfide resin composition including nickel fine particles with a smaller average particle size, and a simple and convenient and versatile method for producing the same.

Further, an object of the present invention is to provide a method capable of producing a polyarylene sulfide having a higher polymerization degree at a low temperature for a short time by solving the problem that in conversion of a cyclic polyarylene sulfide to a polyarylene sulfide, a high temperature and a long time are required, and enhancement of the polymerization degree is difficult. Particularly, a zero-valent nickel compound such as tetrakis(triphenylphosphine) nickel as described in Patent Document 12 has a high effect of accelerating conversion of a cyclic polyarylene sulfide to a polyarylene sulfide, but tends to have low stability, and thus an object of the present invention is to provide a production method using a catalyst having higher stability and satisfactory handling characteristics. For further improving properties, such as mechanical strength and chemical resistance, of a molding-processed article of the polyarylene sulfide resin composition, an object of the present invention is to provide a method for producing an polyarylene sulfide having a higher polymerization degree.

The present invention provides a polyarylene sulfide resin composition including nickel fine particles, and a method for producing the same.

Specifically, aspects of the present invention are as described below.

(1) A polyarylene sulfide resin composition including nickel fine particles having an average particle size of 0.5 to 20 nm.

(2) The polyarylene sulfide resin composition according to (1), wherein the polydispersity of a polyarylene sulfide resin, which is represented by a ratio of weight average molecular weight/number average molecular weight, is 2.5 or less.

(3) The polyarylene sulfide resin composition according to (1) or (2), wherein the weight loss in heating satisfies the following formula:

$$\Delta Wr = (W1 - W2)/W1 \times 100 \leq 0.20(\%)$$

wherein ΔWr is a weight loss ratio (%), a value determined from a sample weight (W2) at the time when the temperature reaches 330° C. with respect to a sample weight (W1) at the time when the temperature reaches 100° C. in thermogravimetric analysis performed at a temperature rise rate of 20° C./minute from 50° C. to any temperature equal to or higher than 330° C. under a non-oxidizing atmosphere at normal pressure.

(4) The polyarylene sulfide resin composition according to any one of (1) to (3), including nickel 0.001 to 20% by mole of atoms based on the amount of sulfur atoms in the polyarylene sulfide resin.

(5) A method for producing a polyarylene sulfide resin composition, the method including heating a cyclic polyarylene sulfide in the presence of at least one selected from the group consisting of (i), (ii) and (iii):

(i) a nickel carboxylate compound including nickel, and a carboxylic acid structure represented by the general formula (A):

[Chemical Formula 1]

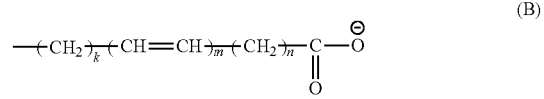

wherein $R^1$ represents hydrogen, or a substituent selected from the group consisting of an aryl group with a carbon number of 6 to 24, an alkenyl group with a carbon number of 1 to 12, an alkynyl group with a carbon number of 1 to 12, and a structure (substituent) represented by the formula (B), where hydrogen of each of the substituents may be substituted with an alkyl group with a carbon number of 1 to 12, and in the formula (B), k represents an integer of 0 to 6, m represents an integer of 0 or 1, and n represents an integer of 0 to 6;
(ii) a nickel carboxylate-amine complex including a primary amine and a nickel carboxylate compound represented by the general formula (C):

[Chemical Formula 2]

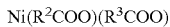

Ni(R$^2$COO)(R$^3$COO)  (C)

wherein R$^2$ and R$^3$ each represent hydrogen or a hydrocarbon group with a carbon number of 1 to 12, where R$^2$ and R$^3$ may be the same or mutually different; and
(iii) a nickel compound represented by the general formula (D):

[Chemical Formula 3]

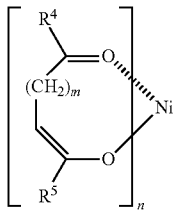

wherein m represents an integer of 0 to 10, n represents an integer of 1 to 3, and R$^4$ and R$^5$ each represent a substituent selected from the group consisting of an alkyl group with a carbon number of 1 to 12, an alkoxy group with a carbon number of 1 to 12, an aryl group with a carbon number of 6 to 24, and a halogen group, where the hydrogen atom of each of the alkyl group, the alkoxy group and the aryl group may be substituted with a halogen atom, and R$^4$ and R$^5$ may be the same or mutually different.
(6) The method for producing a polyarylene sulfide resin composition according to (5), wherein the cyclic polyarylene sulfide is heated in the presence of the nickel carboxylate compound of (i) in which R$^1$ is hydrogen, or a substituent selected from structures where m is 0 in the structure represented by the formula (B).
(7) The method for producing a polyarylene sulfide resin composition according to (5) or (6), wherein the cyclic polyarylene sulfide is heated in the presence of the nickel carboxylate compound of (i) in which R$^1$ is hydrogen, or a substituent selected from structures where k and n are 0 in the structure represented by the formula (B).
(8) The method for producing a polyarylene sulfide resin composition according to (5), wherein the cyclic polyarylene sulfide is heated in the presence of nickel formate.
(9) The method for producing a polyarylene sulfide resin composition according to (5), wherein the cyclic polyarylene sulfide is heated in the presence of the nickel carboxylate-amine complex of (ii) in which R$^2$ is hydrogen or a hydrocarbon group with a carbon number of 1 to 8, and R$^3$ is a hydrocarbon group with a carbon number of 1 to 8.
(10) The method for producing a polyarylene sulfide resin composition according to (5) or (9), wherein the cyclic polyarylene sulfide is heated in the presence of the nickel carboxylate-amine complex of (ii) in which the primary amine is an aliphatic amine.
(11) The method for producing a polyarylene sulfide resin composition according to any one of (5) to (10), wherein the heating is performed under degassing conditions.
(12) The method for producing a polyarylene sulfide resin composition according to (5), wherein the cyclic polyarylene sulfide is heated in the presence of the nickel compound of (iii) in which R$^4$ is a substituent selected from the group consisting of an alkyl group with a carbon number of 1 to 12, an alkoxy group with a carbon number of 1 to 12, and an aryl group with a carbon number of 6 to 24, and R$^5$ is a substituent selected from the group consisting of an alkyl group with a carbon number of 1 to 12, an alkoxy group with a carbon number of 1 to 12, and an aryl group with a carbon number of 6 to 24, where the hydrogen atom of each of the alkyl group, the alkoxy group and the aryl group may be substituted with a halogen atom, and R$^4$ and R$^5$ may be the same or mutually different.
(13) The method for producing a polyarylene sulfide resin composition according to (5), wherein the cyclic polyarylene sulfide is heated in the presence of the nickel compound of (iii) in which R$^4$ and R$^5$ are each a methyl group.
(14) The method for producing a polyarylene sulfide resin composition according to any one of (5), (12) and (13), wherein the cyclic polyarylene sulfide is heated in the presence of the nickel compound of (iii) in which m is 0.
(15) The method for producing a polyarylene sulfide resin composition according to any one of (5) to (14), wherein the resulting polyarylene sulfide resin composition includes nickel fine particles, and the average particle size of the nickel fine particles is 0.5 to 20 nm.
(16) The method for producing a polyarylene sulfide resin composition according to any one of (5) to (15), wherein the heating is performed under a substantially solvent-free condition.
(17) The method for producing a polyarylene sulfide resin composition according to anyone of (5) to (14) or (16), wherein the resulting polyarylene sulfide resin composition includes nickel fine particles.

According to aspects of the present invention, there can be provided a polyarylene sulfide resin composition including nickel fine particles having an average particle size of 0.5 to 20 nm without performing melt kneading and solvent mixing, and a method for producing the composition can be provided.

The polyarylene sulfide resin composition including nickel fine particles according to the present invention can be expected to come into use in various kinds of applications including electronic materials (printed circuits, conductive materials, etc.) as a resin film, magnetic materials (magnetic recording media, electromagnetic wave absorbers, electromagnetic wave resonators, etc.), catalyst materials (fast reaction catalysts, sensors, etc.), structural materials (far infrared materials, composite film forming materials, etc.), optical materials (specific-wavelength-light shielding filters, heat absorbing materials, ultraviolet-ray shielding materials, wavelength conversion materials, polarizing materials, high-refractive-index materials, antiglare materials, light emitting devices, etc.), ceramic/metal materials (sintering additives, coating materials, etc.), medical materials (antibacterial materials, osmosis membranes, etc.) and so on.

Further, by heating a cyclic polyarylene sulfide in the presence of at least one selected from the group consisting of a nickel carboxylate compound including nickel and a carboxylic acid structure represented by the general formula (A); a nickel carboxylate-amine complex including a primary amine and a nickel carboxylate compound represented by the general formula (C); and a nickel compound represented by the general formula (D), nickel fine particles are dispersed in the order of magnitude of several nm to several tens of nm, so that the mechanical properties (e.g. tensile elongation in tensile test, etc.) of the polyarylene sulfide resin composition, and catalytic activity in conversion of a cyclic polyarylene sulfide to a polyarylene sulfide can be considerably improved.

BRIEF DESCRIPTION OF THE DRAWINGS

FIG. 1 is a view showing a TEM image of a polyarylene sulfide resin composition including nickel fine particles as prepared in Example 1.

FIG. 2 is a view showing a TEM image of a polyarylene sulfide resin composition including nickel fine particles as prepared in Example 2.

FIG. 3 is a view showing a TEM image of a polyarylene sulfide resin composition including nickel fine particles as prepared in Example 3.

FIG. 4 is a view showing a TEM image of a polyarylene sulfide resin composition including nickel fine particles as prepared in Example 4.

FIG. 5 is a view showing a TEM image of a polyarylene sulfide resin composition including nickel fine particles as prepared in Example 5.

FIG. 6 is a view showing a TEM image of a polyarylene sulfide resin composition including nickel particles as prepared in Comparative Example 1.

FIG. 7 is a view showing a TEM image of a polyarylene sulfide resin composition including nickel particles as prepared in Comparative Example 2.

FIG. 8 is a view showing a TEM image of a polyarylene sulfide resin composition including nickel fine particles as prepared in Example 6.

FIG. 9 is a view showing a TEM image of a polyarylene sulfide resin composition including nickel fine particles as prepared in Example 7.

FIG. 10 is a view showing a TEM image of a polyarylene sulfide resin composition including nickel fine particles as prepared in Example 8.

FIG. 11 is a view showing a TEM image of a polyarylene sulfide resin composition including nickel particles as prepared in Comparative Example 11.

DETAILED DESCRIPTION OF EMBODIMENTS OF THE INVENTION

Hereinafter, embodiments of the present invention will be described.

<Polyarylene Sulfide>

The polyarylene sulfide in an embodiment of the present invention is a homopolymer or copolymer having a repeating unit of the formula —(Ar—S)— as a main constituent unit and containing preferably 80% by mole or more of the repeating unit. Examples of Ar include units represented by the following formulae (E) to (O), with the unit of the formula (E) being particularly preferred.

[Chemical Formula 4]

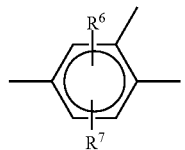
(E)

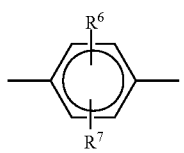
(F)

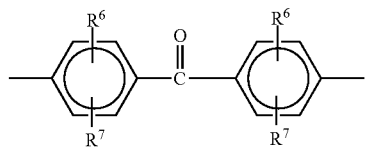
(G)

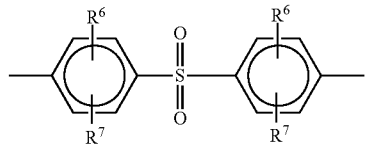
(H)

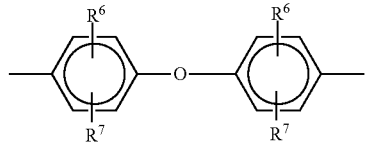
(I)

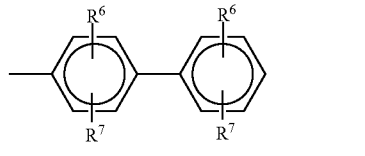
(J)

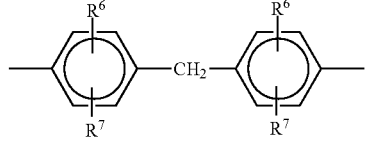
(K)

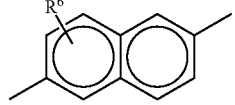
(L)

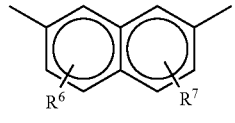
(M)

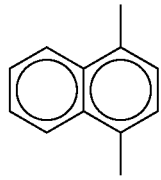
(N)

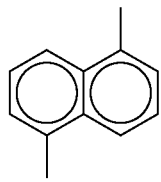
(O)

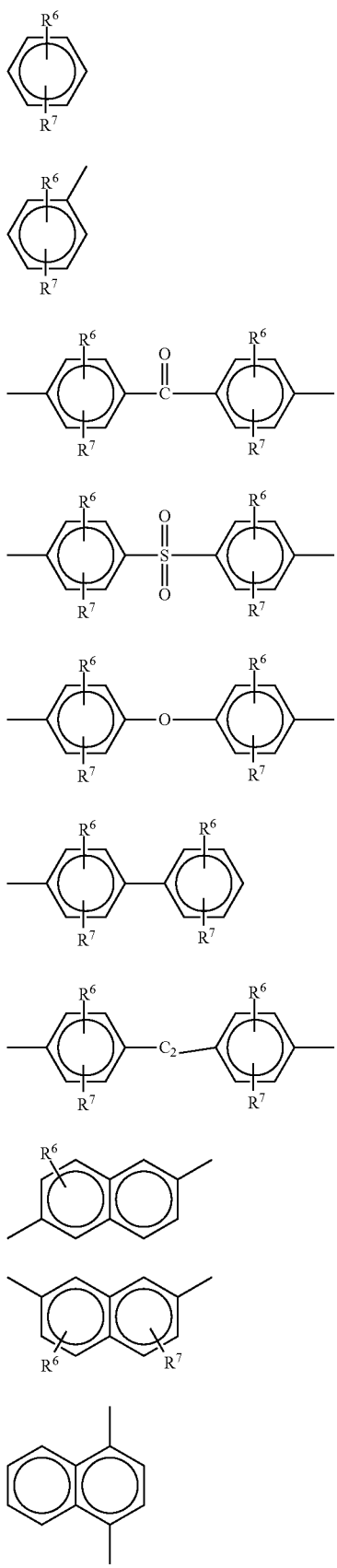

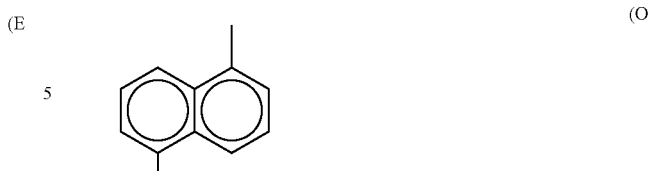

where $R^6$ and $R^7$ are each hydrogen, or a substituent selected from the group consisting of an alkyl group with a carbon atom number of 1 to 12, an alkoxy group with a carbon atom number of 1 to 12, an arylene group with a carbon number of 6 to 24, and a halogen group, where $R^6$ and $R^7$ may be the same or different.

As long as the polyarylene sulfide has this repeating unit as a main constituent unit, it may contain a small amount of branched units or crosslinked units represented by the following formulae (P) to (R) etc. The copolymerization amount of these branched units or crosslinked units is preferably in the range of 0 to 1% by mole based on 1 mol of the unit of —(Ar—S). Namely, the copolymerization amount of these branched units or crosslinked units is preferably in the range of 0 to 0.01 mol parts based on 1 mol part of the unit of —(Ar—S).

[Chemical Formula 5]

$$\begin{array}{c} -(Ar-S)- \\ | \\ S- \end{array} \quad (P)$$

$$\begin{array}{c} -(Ar-S)- \\ | \\ O- \end{array} \quad (Q)$$

$$\begin{array}{c} -(Ar-O)- \\ | \\ O- \end{array} \quad (R)$$

The polyarylene sulfide in the present invention may be any of a random copolymer and a block copolymer containing the above-mentioned repeating unit, and a mixture thereof.

Typical examples thereof include polyphenylene sulfide, polyphenylene sulfide sulfone, polyphenylene sulfide ketone, random copolymers and block copolymers thereof, and mixtures thereof. The especially preferred polyarylene sulfide is polyphenylene sulfide containing 80% by mole or more, particularly 90% by mole or more of a p-phenylene sulfide unit:

[Chemical Formula 6]

$$-\!\!\left(\!\!\begin{array}{c}\phantom{x}\\\phantom{x}\end{array}\!\!-\!S\!\right)\!\!-$$

as a main constituent unit.

The molecular weight of the polyarylene sulfide in an embodiment of the present invention is 10,000 or more, preferably 20,000 or more, more preferably 30,000 or more, further preferably 40,000 or more, further more preferably 50,000 or more, still further preferably 60,000 or more in terms of a weight average molecular weight. When the weight average molecular weight is 10,000 or more, moldability during processing is satisfactory, and properties, such as mechanical strength and chemical resistance, of a molded article are improved. The upper limit of the weight average molecular weight is not particularly limited, but for example, it may be preferably less than 1,000,000, and is more preferably less than 500,000, further preferably less than 200,000, and as long as the weight average molecular weight is in this range, high molding-processability can be achieved.

The polyarylene sulfide obtained by the production method of an embodiment of the present invention tends to have the characteristic that the molecular weight distribution width, i.e. the polydispersity represented by a ratio of the weight average molecular weight to the number average molecular weight (weight average molecular weight/number average molecular weight) is small. The polydispersity of the polyarylene sulfide obtained by the production method of the present invention is preferably 2.5 or less, more preferably 2.3 or less, further preferably 2.1 or less. When the polydispersity is less than 2.5, the amount of low-molecular-weight components contained in the polyarylene sulfide tends to significantly decrease, resulting in exhibition of effects including improvement of mechanical properties when the polyarylene sulfide is used for a molding-processing purpose; reduction of the gas generation amount in heating; reduction of the amount of eluted components during contact with a solvent; and so on. The weight average molecular weight and number average molecular weight can be determined using, for example, a SEC (size exclusion chromatograph) provided with a differential refractive index detector. The lower limit of the polydispersity is theoretically 1, and for example, it may be normally 1.5 or more in the polyarylene sulfide obtained by the production method of the present invention.

The polyarylene sulfide resin composition of the present invention can be obtained by a production method requiring neither a solvent such as N-methylpyrrolidone nor melt kneading, and therefore has the characteristic that a gas derived from residual solvent components, and a gas derived from main chain cleavage due to degradation caused by shear heating during melt kneading, etc. are hardly generated, so that the gas generation amount during heating processing is small.

The gas generation amount can be evaluated from a weight loss ratio $\Delta Wr$ in heating, which is determined by general thermogravimetric analysis and expressed by the following formula.

$$\Delta Wr=(W1-W2)/W1\times100(\%)$$

The weight loss ratio $\Delta Wr$ is a value determined from a sample weight (W2) at the time when the temperature reaches 330° C. with respect to a sample weight (W1) at the time when the temperature reaches 100° C. in thermogravimetric analysis performed at a temperature rise rate of 20° C./minute from 50° C. to any temperature equal to or higher than 330° C. under a non-oxidizing atmosphere at normal pressure.

The atmosphere for the thermogravimetric analysis is a non-oxidizing atmosphere at normal pressure. The non-oxidizing atmosphere refers to an atmosphere in which the concentration of oxygen in a gas phase that is in contact with a sample is 5% by volume or less, preferably 2% by volume or less, and further preferably, substantially no oxygen exists, i.e. an inert gas atmosphere of nitrogen, helium, argon or the like, and in particular, a nitrogen atmosphere is especially preferred from the viewpoint of economy and ease of handling. The normal pressure refers to a pressure approximately in the standard state of the atmosphere, i.e. an atmospheric condition of approximately 101.3 kPa in terms of an absolute pressure at a temperature of approximately 25° C. When the measurement atmosphere is one other than the atmosphere described above, it may be unable to perform measurement appropriate to the practical use of the polyarylene sulfide resin composition due to, for example, occurrence of oxidation etc. of the polyarylene sulfide resin composition during measurement, or a large disparity from an atmosphere that is actually used for molding-processing of the polyarylene sulfide resin composition.

In the measurement of the weight loss ratio $\Delta Wr$, a sample is held at 50° C. for 1 minute, and then heated at a temperature rise rate of 20° C./minute from 50° C. to any temperature equal to or higher than 330° C. to perform thermogravimetric analysis. This temperature range is a temperature range that is frequently used in the practical use of a polyarylene sulfide typified by polyphenylene sulfide, as well as a temperature range that is frequently used at the time when a polyarylene sulfide resin composition in a solid state is melted, and molded into an intended shape. The weight loss ratio at a temperature in such a practical temperature range is associated with the amount of a gas generated from the polyarylene sulfide resin composition during practical use, the amount of components deposited on a mouthpiece and a mold during molding-processing, and so on. Therefore, the polyarylene sulfide resin composition having a low weight loss ratio at a temperature in the above-mentioned range may be an excellent polyarylene sulfide resin composition with high quality. It is desirable to measure the weight loss ratio $\Delta Wr$ with a sample amount of about 10 mg, and the sample is desirable to be in the form of small particles of about 2 mm or less.

When heated in the manner described above, the polyarylene sulfide resin composition of the present invention has a weight loss ratio $\Delta Wr$ of preferably 0.20% or less, more preferably 0.16% or less, further preferably 0.13% or less, still further preferably 0.10% or less.

A weight loss ratio $\Delta Wr$ in the above-mentioned range is preferred because the amount of a gas generated, for example, during molding-processing of the polyarylene sulfide resin composition tends to be small, and the amount of deposits on a mouthpiece and a die during extrusion molding or a mold during injection molding tends to be small, leading to improvement of productivity.

The method for producing a polyarylene sulfide resin composition according to an embodiment of the present invention is characterized in that a cyclic polyarylene sulfide in the presence of at least one selected from the group consisting of a nickel carboxylate compound including nickel and a carboxylic acid structure represented by the general formula (A); a nickel carboxylate-amine complex including a primary amine and a nickel carboxylate compound represented by the general formula (C); and a nickel compound represented by the general formula (D) is heated, and according to this method, a polyarylene sulfide resin composition including nickel fine particles with an average particle size of 0.5 to 20 mm and having the above-mentioned properties can be easily obtained.

The conversion of a cyclic polyarylene sulfide to a polyarylene sulfide in the production method of the present invention is preferably 70% or more, more preferably 80% or more, further preferably 90% or more. When the conversion is 70% or more, a polyarylene sulfide resin composition having the above-mentioned properties can be obtained.

The conversion of a cyclic polyarylene sulfide to a polyarylene sulfide can be calculated from a value obtained by quantitatively determining the weight of a cyclic polyarylene sulfide contained in a raw material before heating and the weight of an unreacted cyclic polyarylene sulfide contained in a product resulting from heating by using high-performance liquid chromatography (HPLC). Specifically, the conversion can be calculated from the equation:

conversion=(weight of cyclic polyarylene sulfide contained in raw material before heating–weight of unreacted cyclic polyarylene sulfide)/weight of cyclic polyarylene sulfide contained in raw material before heating.

<Polyarylene Sulfide Resin Composition Including Nickel Fine Particles>

According to an embodiment of the present invention, a polyarylene sulfide resin composition including nickel fine particles having an average particle size of 0.5 to 20 nm is obtained.

The upper limit of the average particle size of nickel fine particles is 20 nm or less, more preferably 15 nm or less, further preferably 10 nm or less because the area of contact between the polyarylene sulfide and nickel fine particles is large, i.e. the particle size of nickel fine particles is small, so that the above-mentioned properties are obtained.

Further, when the average particle size of nickel fine particles is in the above-mentioned preferred range, high catalytic activity tends to be exhibited in conversion of a cyclic polyarylene sulfide to a polyarylene sulfide.

The average particle size in the present invention is calculated in accordance with the following method unless otherwise specified.

Specifically, the obtained polyarylene sulfide resin composition is observed at a magnification of 20,000 using a transmission electron microscope (TEM) (apparatus: H-7100 manufactured by Hitachi, Ltd.), and an observation image of an observed region with a size of about 1 μm square (1 μm×1 μm) (observation object region) is obtained.

The observation image is then enlarged so that the region of about 1 μm square (1 μm×1 μm) (observation object region) is scaled up to a size of not less than about 20 cm square (20 cm×20 cm) and not more than about 40 cm square (40 cm×40 cm) in the observation image.

Hundred particles are then randomly extracted from the enlarged observation image, a value obtained by averaging a sum of the lengths of the major axis and the minor axis for each of the particles is defined as a representative particle size, and the number average of the representative particle sizes of the particles is calculated as an average particle size.

In the case where 100 particles cannot be extracted from the image after the observation object region of about 1 μm square (1 μm×1 μm) is scaled up to a size of not less than about 20 cm square (20 cm×20 cm) and not more than about 40 cm square (40 cm×40 cm), a wider region is observed and an observation image is obtained. The observation image is then enlarged so that the observed region is scaled up to a size of not less than about 20 cm square (20 cm×20 cm) and not more than about 40 cm square (40 cm×40 cm) in the observation image. Hundred particles are then randomly extracted from the enlarged observation image, and the number average of the representative particle sizes of the particles is calculated as an average particle size. More specifically, in the case where a region of about 1 cm square (1 μm×1 μm) is observed, but 100 particles cannot be extracted therefrom, a region of about 2 μm square (2 μm×2 μm) is observed, followed by trying to extract 100 particles therefrom. In the case where a region of about 2 square (2 μm×2 μm) is observed, but 100 or more particles cannot be extracted therefrom, a region of about 4 μm square (4 μm×4 μm) is observed, followed by trying to extract 100 particles therefrom. In this manner, the observation object is widened so that 100 particles can be extracted, and the average particle size is calculated.

It can be confirmed that fine particles in the polyarylene sulfide resin composition in the transmission electron microscope are those of nickel by using, for example, a transmission electron microscope provided with an energy dispersive X-ray spectroscopy system (EDS). Therefore, in the case where the polyarylene sulfide resin composition includes particles different from nickel fine particles, the particle sizes of nickel fine particles can be selectively determined using a transmission electron microscope provided with an energy dispersive X-ray spectroscopy system (EDS) in place of the transmission electron microscope (apparatus: H-7100 manufactured by Hitachi, Ltd.).

Since it is local information that is obtained by observation with a transmission electron microscope, it is necessary to determine the presence/absence of coarse particles observable visually or with an optical microscope for accurately evaluating the dispersion state of nickel particles. In the case where among coarse particles observable visually or with an optical microscope, particularly visually observable coarse particles (representative particle size: 50 μm or more) exist, the effect of improving the mechanical properties (e.g. tensile elongation in tensile test, etc.) of the polyarylene sulfide resin composition tends to be small or unlikely exhibited, and therefore existence of visually observable coarse particles in the polyarylene sulfide resin is not preferred.

A variation in particle size of nickel fine particles in the polyarylene sulfide resin composition in the present invention can be evaluated using a coefficient of variation (CV). The coefficient of variation can be calculated in accordance with the following formula from an average particle size calculated in accordance with the above-mentioned method, and a standard deviation of the representative particle sizes of 100 nickel fine particles used for deriving the average particle size.

coefficient of variation=standard deviation/average particle size×100(%)

The variation (coefficient of variation) in particle size is preferably small. When the coefficient of variation is small, the heat stability of the polyarylene sulfide resin composition is improved, the mechanical properties (strength, high toughness with excellent elongation, etc.) and heat conductivity of a molding-processed article of the polyarylene sulfide resin composition becomes more stable, so that the variation in properties decreases. The upper limit of the coefficient of variation may be, for example, 100% or less, and is preferably 70% or less, more preferably 60% or less, further preferably 50% or less, further more preferably 40% or less, still further preferably 30% or less. The lower limit of the coefficient of variation is theoretically 0, and for example, it may be normally 1% or more.

The content of nickel in the polyarylene sulfide resin composition can be quantitatively determined by, for example, incinerating the polyarylene sulfide resin composition, and decomposing the resulting ash constituent with nitric acid and hydrofluoric acid under heating, then dissolving the decomposed product in dilute nitric acid, and analyzing a certain volume of the resulting solution using an ICP mass spectrometer and an ICP emission spectrophotometric analyzer.

The lower limit of the amount of nickel in the polyarylene sulfide resin composition in the present invention is preferably 0.001% by mole or more, more preferably 0.004% by mole or more, further preferably 0.005% by mole or more, most preferably 0.01% by mole or more based on the amount of sulfur atoms in the polyarylene sulfide. That is, the content of nickel atoms (the number of nickel atoms) in the polyarylene sulfide resin composition is preferably 0.001 parts by mole or more, more preferably 0.004 parts by mole or more, further preferably 0.005 parts by mole or more, most preferably 0.01 parts by mole or more based on 100 parts by mole of the content of sulfur atoms (the number of sulfur atoms) in the polyarylene sulfide resin composition. The content of nickel atoms in the polyarylene sulfide resin composition is preferably 0.0005 parts by weight or more, more preferably 0.002 parts by weight or more, further preferably 0.003 parts by weight or more, further more preferably 0.005 parts by weight or more based on 100 parts by weight of the polyarylene sulfide resin composition. When the content of nickel atoms is in the above-mentioned range, high heat stability can be imparted to the polyarylene sulfide resin composition, and high mechanical properties (strength, high toughness with excellent elongation, etc.) and excellent heat conductivity can be imparted to a molding-processed article of the polyarylene sulfide resin composition. In the polyarylene sulfide resin composition including nickel fine particles according to an embodiment of the present invention, the average particle size of nickel fine particles is small, and therefore the area of contact between the nickel fine particles and the polyarylene sulfide tends to be large, so that the mechanical properties and heat conductivity of a molding-processed article of the polyarylene sulfide resin composition tends to be easily secured even with a smaller amount of nickel as compared to the amount of nickel in a polyarylene sulfide resin composition obtained by a conventional method using melt kneading or solvent mixing.

Further, when the content of nickel particles is in the above-mentioned preferred range, conversion of a cyclic polyarylene sulfide to a polyarylene sulfide tends to proceed at a lower temperature in a shorter time in the method for producing a polyarylene sulfide resin composition according to the present invention, so that a polyarylene sulfide resin composition including nickel fine particles can be obtained.

The upper limit of the content of nickel (the number of nickel atoms) in the polyarylene sulfide resin composition in the present invention is preferably 20% by mole or less, more preferably 15% by mole or less, further preferably 10% by mole or less based on the content of sulfur atoms in the polyarylene sulfide. That is, the content of nickel atoms (the number of nickel atoms) in the polyarylene sulfide resin composition is preferably 20 parts by mole or less, more preferably 15 parts by mole or less, further preferably 10 parts by mole or less based on 100 parts by mole of the content of sulfur atoms (the number of sulfur atoms) in the polyarylene sulfide resin composition. The content of nickel atoms in the polyarylene sulfide resin composition is preferably 11 parts by weight or less, more preferably 8 parts by weight or less, further preferably 5 parts by weight or less based on 100 parts by weight of the polyarylene sulfide resin composition. When the content of nickel atoms is in the above-mentioned range, nickel fine particles are satisfactorily dispersed, so that high heat stability can be imparted to the polyarylene sulfide resin composition, and high mechanical properties (strength, high toughness with excellent elongation, etc.) and excellent heat conductivity can be imparted to a molding-processed article of the polyarylene sulfide resin composition.

For reducing the gas generation amount during heating-processing, it is preferred that nickel fine particles in the polyarylene sulfide resin composition of the present invention are mainly composed of an inorganic nickel compound, and the number of nickel atoms derived from the inorganic nickel compound is preferably 50% by mole or more, more preferably 70% by mole or more, further preferably 90% by mole or more based on 100% by mole of the number of all nickel atoms contained in the polyarylene sulfide resin composition.

Examples of the inorganic nickel compound include zero-valent nickel, nickel oxide and nickel sulfide, but among them, the main component is preferably zero-valent nickel, and the content of zero-valent nickel in the total nickel compound is preferably 50% by mole or more, more preferably 70% or more, further preferably 90% or more. When the content of zero-valent nickel is in the above-mentioned range, the weight loss ratio in heating of the polyarylene sulfide resin composition is low, the amount of a gas generated during molding-processing is small, and the amount of deposits on a mouthpiece and a die during extrusion molding or a mold during injection molding is small, leading to improvement of productivity.

<Cyclic Polyarylene Sulfide>

The cyclic polyarylene sulfide in the method for producing a polyarylene sulfide resin composition according to an embodiment of the present invention has a repeating unit of the formula —(Ar—S)— as a main constituent unit, and contains 50% by weight or more, preferably 70% by weight or more, more preferably 80% by weight or more, further preferably 90% by weight or more of a cyclic compound containing preferably 80% by mole of the repeating unit and represented by the following general formula (S). Examples of Ar include units represented by the formulae (E) to (O), with the unit of the formula (E) being particularly preferred.

[Chemical Formula 7]

(S)

The cyclic compound represented by the formula (S) in the cyclic polyarylene sulfide may contain repeating units such as those of the formulae (E) to (O) at random or blockwise, or may be any mixture of the repeating units. Typical examples thereof include cyclic polyphenylene sulfide, cyclic polyphenylene sulfide sulfone, cyclic polyphenylene sulfide ketone, cyclic random copolymers and cyclic block copolymers including these compounds, and mixtures thereof. The especially preferred cyclic compound represented by the formula (S) is a cyclic compound containing 80% by mole or more, particularly 90% by mole or more of a p-phenylene sulfide unit:

[Chemical Formula 8]

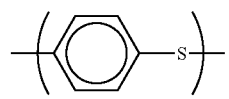

as a main constituent unit.

The repetition number m in the compound represented by the formula (S), which is contained in the cyclic polyarylene sulfide, is not particularly limited, but is preferably 4 to 50. Here, the lower limit of the repetition number m is preferably 4 or more, more preferably 5 or more, further preferably 6 or more, further more preferably 7 or more, still further preferably 8 or more. Since a cyclic compound in which m is small tends to have low reactivity, it is preferred that m is in the above-mentioned range for preparing a polyarylene sulfide in a short time. On the other hand, the upper limit of m is preferably 50 or less, more preferably 25 or less, further preferably 15 or less. It is preferred that conversion of a cyclic polyarylene sulfide to a polyarylene sulfide by heating is performed at a temperature equal to or higher than the temperature at which the cyclic polyarylene sulfide is melted, but the temperature at which the cyclic polyarylene sulfide is melted tends to increase as m becomes larger. Therefore, it is preferred that m is in the above-mentioned range for performing conversion of a cyclic polyarylene sulfide to a polyarylene sulfide at a lower temperature.

The cyclic compound represented by the formula (S) contained in the cyclic polyarylene sulfide may be either a single compound having a single repetition number, or a mixture of cyclic compounds having different repetition numbers, but the mixture of cyclic compounds having different repetition numbers tends to be melted at a lower temperature as compared to the single compound having a single repetition number, and thus the use of the mixture of cyclic compounds having different repetition numbers is preferred because conversion to a polyarylene sulfide can be performed at a lower heating temperature.

The component other than the cyclic compound represented by the formula (S) in the cyclic polyarylene sulfide is especially preferably a polyarylene sulfide oligomer. Here, the polyarylene sulfide oligomer is a homooligomer or cooligomer having a repeating unit of the formula —(Ar—S)— as a main constituent unit and containing preferably 80% by mole or more of the repeating unit. Examples of Ar include units represented by the formulae (E) to (O), with the unit of the formula (E) being particularly preferred. As long as the polyarylene sulfide oligomer has the repeating unit as a main constituent unit, it may contain a small amount of branched units or crosslinked units represented by the formulae (P) to (R) etc. The copolymerization amount of these branched units or crosslinked units is preferably in the range of 0 to 1% by mole based on 1 mol of the unit of —(Ar—S). Namely, the copolymerization amount of these branched units or crosslinked units is preferably in the range of 0 to 0.01 mol parts based on 1 mol part of the unit of —(Ar—S). The polyarylene sulfide oligomer may be any of a random copolymer and a block copolymer containing the above-mentioned repeating unit, and a mixture thereof.

Typical examples thereof include polyphenylene sulfide oligomers, polyphenylene sulfide sulfone oligomers, polyphenylene sulfide ketone oligomers, random copolymers and block copolymers thereof, and mixtures thereof. Examples of the especially preferred polyarylene sulfide oligomer include polyphenylene sulfide oligomers containing 80% by mole or more, particularly 90% by mole or more of a p-phenylene sulfide unit as a main constituent unit of the polymer.

The molecular weight of the polyarylene sulfide oligomer may be, for example, a molecular weight lower than that of the polyarylene sulfide, and specifically, it is preferably less than 10,000 in terms of a weight average molecular weight.

The amount of the polyarylene sulfide oligomer contained in the cyclic polyarylene sulfide is preferably less than the amount of the cyclic compound represented by the formula (S) contained in the cyclic polyarylene sulfide. That is, the weight ratio of the cyclic compound represented by the formula (S) to the polyarylene sulfide oligomer (cyclic compound represented by the formula (S)/polyarylene sulfide oligomer) in the cyclic polyarylene sulfide is preferably more than 1, more preferably 2.3 or more, further preferably 4 or more, further more preferably 9 or more, and by using such a cyclic polyarylene sulfide, a polyarylene sulfide having a weight average molecular weight of 10,000 or more can be easily obtained.

Therefore, the weight average molecular weight of the polyarylene sulfide obtained by the method for producing a polyarylene sulfide in the present invention tends to increase as the value of the weight ratio of the cyclic compound represented by the formula (S) to the polyarylene sulfide oligomer in the cyclic polyarylene sulfide becomes higher. The upper limit of the above-mentioned weight ratio is not particularly limited, but for ensuring that the weight ratio is more than 100, it is necessary to remarkably reduce the content of the polyarylene sulfide oligomer in the cyclic polyarylene sulfide, so that enormous labor is required. According to the method for producing a polyarylene sulfide in the present invention, a polyarylene sulfide having a weight average molecular weight of 10,000 or more can be easily obtained even when a cyclic polyarylene sulfide with the weight ratio being 100 or less is used.

The weight ratio of the cyclic compound represented by the formula (S) to the polyarylene sulfide oligomer in the cyclic polyarylene sulfide can be calculated from the amount of the cyclic compound represented by the formula (S) in the cyclic polyarylene sulfide, which is quantitatively determined using HPLC. For example, the component other than the cyclic compound represented by the formula (S) in the cyclic polyarylene sulfide is a polyarylene sulfide oligomer, the weight ratio can be calculated from the equation:

$$\text{weight ratio} = \text{amount of cyclic compound of the formula } (P) \, (\%)/(100 - \text{amount of cyclic compound represented by the formula } (S) \, (\%)).$$

The upper limit of the molecular weight of the cyclic polyarylene sulfide to be used for production of the polyarylene sulfide in the present invention is preferably 10,000 or less, more preferably 5,000 or less, further preferably 3,000 or less in terms of a weight average molecular weight, while the lower limit of the molecular weight of the cyclic polyarylene sulfide is preferably 300 or more, more preferably 400 or more, further preferably 500 or more in terms of a weight average molecular weight.

<Nickel Compound Serving as Polymerization Catalyst and Nickel Fine Particle Source>

For producing the polyarylene sulfide resin composition including nickel fine particles according to an embodiment of the present invention by heating the cyclic polyarylene sulfide, at least one nickel compound selected from the group consisting of (i), (ii) and (iii) is used as a polymerization catalysts and a nickel fine particle source:

(i) a nickel carboxylate compound including nickel, and a carboxylic acid structure represented by the general formula (A):

[Chemical Formula 9]

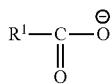
(A)

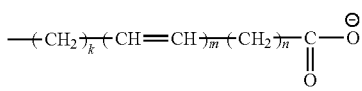
(B)

wherein $R^1$ represents hydrogen, or a substituent selected from the group consisting of an aryl group with a carbon number of 6 to 24, an alkenyl group with a carbon number of 1 to 12, an alkynyl group with a carbon number of 1 to 12, and a structure (substituent) represented by the formula (B), where hydrogen of each of the substituents may be substituted with an alkyl group with a carbon number of 1 to 12, and in the formula (B), k represents an integer of 0 to 6, m represents an integer of 0 or 1, and n represents an integer of 0 to 6;
(ii) a nickel carboxylate-amine complex including a primary amine and a nickel carboxylate compound represented by the general formula (C):

[Chemical Formula 10]

$$Ni(R^2CO)(R^3COO) \quad (C)$$

wherein $R^2$ and $R^3$ each represent hydrogen or a hydrocarbon group with a carbon number of 1 to 12, where $R^2$ and $R^3$ may be the same or mutually different; and
(iii) a nickel compound represented by the general formula (D):

[Chemical Formula 11]

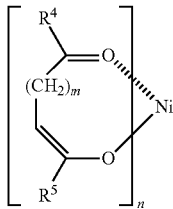
(D)

wherein m represents an integer of 0 to 10, n represents an integer of 1 to 3, and $R^4$ and $R^5$ each represent a substituent selected from the group consisting of an alkyl group with a carbon number of 1 to 12, an alkoxy group with a carbon number of 1 to 12, an aryl group with a carbon number of 6 to 24, and a halogen group, where the hydrogen atom of each of the alkyl group, the alkoxy group and the aryl group may be substituted with a halogen atom, and $R^4$ and $R^5$ may be the same or mutually different.

<(i) Nickel Carboxylate Compound Including Nickel and Carboxylic Acid Structure Represented by General Formula (A)>

The nickel carboxylate compound including nickel and a carboxylic acid structure represented by the general formula (A) is effective as a polymerization catalyst and a nickel fine particle source when $R^1$ is hydrogen, or a substituent selected from the group consisting of an aryl group with a carbon number of 6 to 24, an alkenyl group with a carbon number of 1 to 12, an alkynyl group with a carbon number of 1 to 12, and a structure (substituent) represented by the formula (B), where hydrogen of each of the substituents may be substituted with an alkyl group with a carbon number of 1 to 12. Examples of $R^1$ may include hydrogen; phenyl, benzyl, tolyl, xylyl, biphenyl and naphthyl as the aryl group;
methenyl, ethenyl, propenyl, butenyl, pentenyl, hexenyl, heptynyl, octenyl, nonenyl, decenyl, undecenyl and dodecenyl as the alkenyl group; and
methinyl, ethinyl, propynyl, butynyl, pentynyl, hexynyl, heptynyl and octynyl as the alkynyl group. Examples of the carboxylic acid including a structure represented by the formula (B) may include oxalic acid, malonic acid, succinic acid, glutaric acid, adipic acid, maleic acid, fumaric acid, benzoic acid and phthalic acid.

The nickel carboxylate compound including nickel and a carboxylic acid structure represented by the general formula (A) may be an anhydride, or may be a hydrate.

The mechanism of action of the nickel carboxylate compound in an embodiment of the present invention as a polymerization catalyst is unknown at the present time, but it is thought an active nickel compound is generated during decomposition reaction by heating without requiring existence and addition of a ligand or a reducing agent, and the active nickel compound may be a zero-valent nickel compound that is generated by reduction of nickel atoms during decomposition reaction by heating. Further, during generation of the active nickel compound, the active nickel compound may be dispersed as fine particles, resulting in improvement of catalytic activity during conversion of the cyclic polyarylene sulfide to the polyarylene sulfide.

It is considered that in nickel carboxylate compounds which do not include a carbon-carbon multiple bond in the structure of the nickel carboxylate compound, among the nickel carboxylate compounds described above, a reaction other than the reaction for generation of the active nickel compound tends to hardly occur, and thus $R^1$ is more preferably hydrogen, or a substituent selected from structures where m is 0 in the structure represented by the formula (B). That is, in the present invention, it is preferred from the above point of view that the (i) nickel carboxylate compound including nickel and a carboxylic acid structure represented by the general formula (A) satisfies the following requirement (1) or (2).
(1) $R^1$ is hydrogen.
(2) $R^1$ is a structure (substituent) represented by the formula (B), where m is 0.

Specifically, for example, mention may be made of formic acid having hydrogen as $R^1$, and oxalic acid, malonic acid, succinic acid, glutaric acid, adipic acid and the like as the carboxylic acid including a structure represented by the formula (B).

Further, it is considered that when the number of carbon atoms in the carboxylic acid structure in the nickel carboxylate compound is smaller, the effect of accelerating conversion of a cyclic polyarylene sulfide to a polyarylene sulfide tends to be higher with respect to the amount of a polymerization catalyst added, so that a reaction other than the reaction for generation of the active nickel compound tends to hardly occur, and thus $R^1$ is more preferably hydrogen, or a substituent selected from structures where k and n are 0 in the structure represented by the formula (B). That is, in the present invention, it is preferred from the above point of view that the (i) nickel carboxylate compound including nickel and a carboxylic acid structure represented by the general formula (A) satisfies the following requirement (1) or (3). In the present invention, an aspect in which the above requirement (2) and the following requirement (3) are both satisfied is also one of preferred aspects. Specifically, in the present invention, an aspect in which $R^1$ is a structure (substituent) represented by the formula (B), where k, m and n are 0, is also one of preferred aspects.

(1) $R^1$ is hydrogen.

(3) $R^1$ is a structure (substituent) represented by the formula (B), where k and n are 0.

For example, mention may be made of formic acid, oxalic acid and the like.

Among them, nickel formate is preferred because a decomposition reaction by heating tends to occur at a lower temperature.

The reason why a nickel compound is effective is unknown at the present time, but is thought to be that since nickel tends to have a relatively small atomic radius among transition metal atoms, the distance between nickel atoms and the carboxylic acid structure easily decreases, and thus nickel atoms and the carboxylic acid structure easily interact during decomposition reaction by heating, so that an active nickel compound is easily generated, or nickel atoms tend to strongly interact with a cyclic polyarylene sulfide structure, or nickel atoms are capable of forming a compound which is easily dispersed in a cyclic polyarylene sulfide.

The feature of an embodiment of the present invention consists in that a cyclic polyarylene sulfide is heated in the presence of a nickel carboxylate compound including nickel and a carboxylic acid structure represented by the general formula (A), and the nickel carboxylate compound may be added as a raw material, or the nickel carboxylate compound may be generated in the system. One nickel carboxylate compound may be used alone, or two or more nickel carboxylate compounds may be used in combination. Examples of the method for generating the nickel carboxylate compound in the system as in the latter case include a method in which a nickel carboxylate compound is generated from a nickel salt such as, for example, nickel sulfate, nickel nitrate or a nickel halide, and a carboxylic acid like a method that is used in a general method for synthesis of a nickel carboxylate compound in a solution.

<(ii) Nickel Carboxylate Compound-Amine Complex Including Primary Amine and Nickel Carboxylate Compound Represented by General Formula (C)>

The nickel carboxylate compound-amine complex including a primary amine and a nickel carboxylate compound represented by the general formula (C) is effective as a polymerization catalyst and a nickel fine particle source when $R^2$ and $R^3$ are each hydrogen, or a hydrocarbon group with a carbon number of 1 to 12, where hydrogen of each of the substituents may be substituted with an alkyl group with a carbon number of 1 to 12. For example, a nickel carboxylate compound-amine complex in which $R^2$ and $R^3$ are each hydrogen, an alkyl group, an aryl group, an alkenyl group or an alkynyl group is preferred as a polymerization catalyst and a nickel fine particle source ($R^2$ and $R^3$ may be the same or mutually different). More specific examples of $R^2$ and $R^3$ may include hydrogen;

methyl, ethyl, propyl, isopropyl, n-butyl, isobutyl, s-butyl, t-butyl, n-pentyl, isopentyl, t-pentyl, n-hexyl, isohexyl, s-hexyl, t-hexyl, n-heptyl, isoheptyl, s-heptyl, t-heptyl, n-octyl, isooctyl, s-octyl, t-octyl, n-nonyl, isononyl, s-nonyl, t-nonyl, n-decanyl, isodecanyl, s-decanyl, t-decanyl, n-undecanyl, isoundecanyl, s-decanyl, t-decanyl, n-dodecanyl, isododecanyl, s-dodecanyl and t-dodecanyl as the alkyl group; phenyl, benzyl, tolyl, xylyl, biphenyl and naphthyl as the aryl group;

methenyl, ethenyl, propenyl, butenyl, pentenyl, hexenyl, heptenyl, octenyl, nonenyl, decenyl, undecenyl and dodecenyl as the alkenyl group;

methinyl, ethinyl, propynyl, butynyl, pentynyl, hexynyl, heptynyl and octynyl as the alkynyl group; and phenyl, benzyl, tolyl, xylyl, biphenyl and naphthyl as the aryl group.

The nickel carboxylate compound represented by the general formula (C) may be an anhydride, or may be a hydrate.

The mechanism of action of the nickel carboxylate-amine complex in the present invention as a polymerization catalyst is unknown at the present time, but Japanese Patent Laid-open Publication No. 2010-64983 and International Publication No. WO 2011/115213 disclose that zero-valent nickel is generated by heating an amine complex of nickel carboxylate. It is thought that an active nickel compound is generated during decomposition reaction of the nickel carboxylate-amine complex by heating, and the active nickel compound may be a zero-valent nickel compound that is generated by reduction of nickel atoms during decomposition reaction by heating. Further, during generation of the active nickel compound, the active nickel compound may be dispersed as fine particles, resulting in improvement of catalytic activity during conversion of the cyclic polyarylene sulfide to the polyarylene sulfide.

It is considered that in nickel carboxylate compounds which do not include a carbon-carbon multiple bond in the structure of the nickel carboxylate compound represented by the general formula (C), among the nickel carboxylate-amine complexes described above, a reaction other than the reaction for generation of the active nickel compound tends to hardly occur, and thus $R^2$ and $R^3$ are each more preferably hydrogen, or a substituent selected from alkyl groups.

Further, it is considered that when the number of carbon atoms in the carboxylic acid structure in the nickel carboxylate-amine complex is smaller, the effect of accelerating conversion of a cyclic polyarylene sulfide to a polyarylene sulfide tends to be higher with respect to the amount of a polymerization catalyst added, so that a reaction other than the reaction for generation of the active nickel compound tends to hardly occur, and thus $R^2$ and $R^3$ are each preferably hydrogen or a hydrocarbon group with a carbon number of 1 to 12, more preferably hydrogen or a hydrocarbon group with a carbon number of 1 to 8.

That is, in the present invention, $R^2$ contained in the (ii) nickel carboxylate-amine complex including a primary amine and a nickel carboxylate compound represented by the general formula (C) is preferably hydrogen or a hydrocarbon group with a carbon number of 1 to 12. Above all, $R^2$ is most preferably hydrogen. On the other hand, when $R^2$ is a hydrocarbon group with a carbon number of 1 to 12, the hydrocarbon group is preferably an alkyl group. When $R^2$ is a hydrocarbon group, the number of carbon atoms thereof is preferably 1 to 8.

Similarly, in the present invention, $R^3$ contained in the (ii) nickel carboxylate-amine complex including a primary amine and a nickel carboxylate compound represented by the general formula (C) is preferably hydrogen or a hydrocarbon group with a carbon number of 1 to 12. Above all, $R^3$ is most preferably hydrogen. On the other hand, when $R^3$ is a hydrocarbon group with a carbon number of 1 to 12, the hydrocarbon group is preferably an alkyl group. When $R^3$ is a hydrocarbon group, the number of carbon atoms thereof is preferably 1 to 8.

In the present invention, $R^2$ and $R^3$ may be the same or mutually different, and $R^2$ and $R^3$ are especially preferably hydrogen. When $R^2$ and $R^3$ are hydrogen, the nickel carboxylate compound in the general formula (C) is nickel formate.

Among the nickel carboxylate compound-amine complexes, a nickel formate-amine complex including a nickel formate compound and a primary amine is preferred because a decomposition reaction by heating tends to occur at a lower temperature.

The amine in the nickel carboxylate-amine complex is not particularly limited as long as it is a primary amine and is capable of forming a complex with nickel ions, one that is solid or liquid at normal temperature and normal pressure is used. Here, the normal temperature and normal pressure refers to a state at 25° C. and 1 atm. A primary amine that is liquid at normal temperature also serves as a solvent in formation of a nickel carboxylate-amine complex. Even a primary amine that is solid at normal temperature and normal pressure may be used when it is liquefied by heating at 100° C. or higher, or dissolved in an organic solvent.

The primary amine can also act as a dispersing agent to suppress aggregation of particles in production of a polyarylene sulfide resin composition including nickel fine particles.

The primary amine may be an aromatic primary amine, but it is more preferably an aliphatic primary amine from the viewpoint of ease of forming a nickel carboxylate-amine complex. Examples of the aliphatic primary amine include octylamine, trioctylamine, dioctylamine, hexadecylamine, dodecylamine, tetradecylamine, stearylamine, oleylamine, myristylamine and laurylamine.

The primary amine is capable of forming a complex with nickel ions, and effectively exhibits an ability to reduce a nickel complex (or nickel ions). On the other hand, the secondary amine has high steric hindrance, and therefore may hinder satisfactory formation of a nickel carboxylate-amine complex, and the tertiary amine does not have an ability to reduce nickel ions. Thus, none of these amines can be used.

Since the primary amine may also serve as a surface modifier during generation of nickel fine particles, secondary aggregation tends to be suppressed even after removal of the primary amine.

Further, the primary amine is preferably one having a boiling point higher than a reducing temperature from the viewpoint of ease of controlling a reaction at the time when a nickel carboxylate-amine complex is reduced to obtain nickel nanoparticles. Specifically, the primary amine is preferably one having a boiling point of 180° C. or higher, more preferably one having a boiling point of 200° C. or higher. Preferably, the aliphatic primary amine has a carbon number of 8 or more. Here, for example, $C_8H_{17}NH_2$ (octylamine), an aliphatic amine with a carbon number of 8, has a boiling point of 185° C.

The divalent nickel ion is known as a ligand substitution active species, and the ligand of the resulting complex may be easily subjected to ligand exchange depending on a temperature or concentration, leading to a change in the complex. In formation of a complexing reaction solution by heating, for example, a mixture of a primary amine and a nickel carboxylate compound represented by the general formula (C), carboxylate ions ($R^2COO^-$) and ($R^3COO^-$) may be coordinated in bidentate coordination (T) or unidentate coordination (U) as shown in, for example, the following formula when considering steric hindrance associated with a carbon chain length of the amine used, etc., and further, the nickel carboxylate-amine complex may have a structure (V) in which carboxylate ions exist in the outer sphere if the concentration of the amine is extremely high. For forming a uniform solution at an intended reaction temperature (reducing temperature), the nickel carboxylate-amine complex is required to have a structure in which at least one of ligands represented by $L^1$, $L^2$, $L^3$, $L^4$, $L^5$ and $L^6$ is a primary amine, and the primary amine is coordinated to nickel ions. For securing the above-mentioned state, the primary amine should excessively exist in the reaction solution, and at least, the primary amine exists in an amount of preferably 2 moles or more, more preferably 2.2 moles or more, further preferably 4 moles or more based on 1 mole of nickel ions.

[Chemical Formula 12]

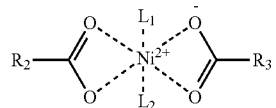

(T)

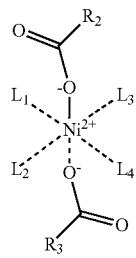

(U)

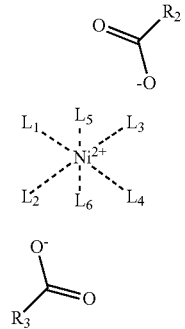

(V)

For example, synthesis of a nickel carboxylate-amine complex which is generated by a reaction of a primary amine with a nickel carboxylate compound represented by the general formula (C) may be performed using the method described in Japanese Patent Laid-open Publication No. 2010-64983 or International Publication No. WO 2011/115213.

The complex forming reaction can be carried out either under the atmospheric pressure, or under a compressed condition above the atmospheric pressure, or under a decompressed condition, or under a degassing condition. Preferably, the complex forming reaction is carried out under a non-oxidizing atmosphere for suppressing oxidation of the nickel carboxylate compound represented by the general formula (C), the primary amine and the resulting nickel carboxylate-amine complex.

The temperature of the complex forming reaction varies depending on conditions in a system where the complex forming reaction is carried out, but for example, the complex forming reaction under the atmospheric pressure can be made to proceed even at room temperature, and it is preferred to perform heating at a temperature of 100° C. or higher for reliably and more efficiently carrying out the reaction.

For reliably and more efficiently carrying out the complex forming reaction as described above, the lower limit of the heating temperature is preferably 100° C. or higher, more preferably 105° C. or higher, further preferably 125° C. or higher, further more preferably 140° C. or higher.

The heating is particularly advantageous when a hydrate of a nickel carboxylate compound such as, for example, nickel formate dihydrate or nickel acetate tetrahydrate is used as the nickel carboxylate compound represented by the general formula (C).

Accordingly, for example, a ligand substitution reaction of the primary amine with coordinated water coordinated to the nickel carboxylate compound represented by the general formula (C) is efficiently carried out, so that water molecules as complex ligands can be dissociated, and further expelled to outside the system, and therefore a nickel carboxylate-amine complex can be efficiently formed. For example, nickel formate dihydrate has a complex structure in which two coordinated waters and two formate ions as bidentate ligands exist at room temperature, and thus the water molecules as two complex ligands are easily dissociated by heating, so that formation of a complex by ligand substitution with the primary amine can efficiently proceed.

The upper limit of the heating temperature is preferably 175° C. or lower, more preferably 160° C. or lower for completing the complex forming reaction while reliably separating the reaction from a subsequent process for heating and reducing a nickel complex (or nickel ions).

The heating time can be appropriately determined according to the heating temperature and the content of each raw material, but it is preferably 15 minutes or more for reliably completing the complex forming reaction. The upper limit of the heating time is not particularly limited, but heating for a long period of time is wasteful in view of saving energy consumption and process time. The method for this heating is not particularly limited, and may be, for example, heating by a heat medium such as an oil bath, or heating by microwave irradiation.

The degree of the progress of the complex forming reaction of the primary amine with the nickel carboxylate compound represented by the general formula (C) can be determined using, for example, an infrared absorption spectrum or ultraviolet-visible absorption spectrum measurement apparatus. For example, when infrared absorption spectrum measurement is performed in a complex forming reaction of nickel formate dihydrate and stearylamine, it is found that a peak at 3100 to 3400 cm$^{-1}$ originating from O—H of hydrated water of nickel formate dihydrate disappears after completion of the reaction, and instead, a sharp peak exists at each of the positions of 2950 to 2850 cm$^{-1}$ based on stretching vibrations of the aliphatic C—H group, 3325 cm$^{-1}$ and 3283 cm$^{-1}$ based on N—H stretching vibrations and 1630 cm$^{-1}$ based on bending vibrations of the N—H group, and thus it can be confirmed that the amine is coordinated to nickel. When measurement of a wavelength of maximum absorption in an infrared absorption spectrum, which is observed in a wavelength range of 300 nm to 750 nm, is performed by an ultraviolet-visible absorption spectrum measurement apparatus, it can be confirmed that the amine is coordinated to nickel by observing a shift of the wavelength of maximum absorption in the reaction solution with respect to the wavelength of maximum absorption in the raw material (e.g. the wavelength of maximum absorption is 710 nm for nickel acetate tetrahydrate).

<(iii) Nickel Compound Represented by General Formula (D)>

The nickel compound represented by the general formula (D) is effective as a polymerization catalyst and a nickel fine particle source when m is an integer of 0 to 10, but from the viewpoint of steric stability of the nickel compound structure, m is preferably an integer of 0 to 5, and further, from the viewpoint of electronic stability of the nickel compound structure, m is more preferably 0 because the nickel compound may have a resonance structure.

n represents an integer of 1 to 3, the integer being identical to the valence of nickel.

The nickel compound is effective as a polymerization catalyst and a nickel fine particle source when $R^4$ and $R^5$ are each a substituent selected from the group consisting of an alkyl group with a carbon atom number of 1 to 12, an alkoxy group with a carbon atom number of 1 to 12, an aryl group with a carbon number of 6 to 24, and a halogen group. The hydrogen atom of each of the alkyl group, the alkoxy group and the aryl group may be substituted with a halogen atom, and $R^4$ and $R^5$ may be the same or mutually different. Examples of $R^4$ and $R^5$ may include methyl, ethyl, propyl, isopropyl, butyl, butyl, butyl, pentyl, hexyl, heptyl, octyl, nonyl, decyl, undecyl, dodecyl and halogen-substituted products thereof;

methoxy, ethoxy, propyloxy, pentyloxy, hexyloxy, heptyloxy, octyloxy, nonyloxy, decyloxy, undecyloxy, dodecyloxy and halogen-substituted products thereof;

phenyl, benzyl, tolyl, xylyl, biphenyl, naphthyl and halogen-substituted products thereof; and fluorine, chlorine, bromine and iodine. Specific examples of the nickel compound may include bis(2,4-pentanedionato) nickel and bis(trifluoro-2,4-pentanedionato) nickel.

Particularly, when $R^4$ and $R^5$ are electron-donating groups, the effect of accelerating conversion of a cyclic polyarylene sulfide tends to be high, and therefore $R^4$ and $R^5$ are each preferably a substituent selected from the group consisting of an alkyl group with a carbon number of 1 to 12, an alkoxy group with a carbon number of 1 to 12 and an aryl group with a carbon number of 6 to 24 (where the hydrogen atom of each of the alkyl group, the alkoxy group and the aryl group may be substituted with a halogen atom, and $R^4$ and $R^5$ may be the same or mutually different).

That is, $R^4$ is more preferably a substituent selected from the group consisting of an alkyl group with a carbon atom number of 1 to 12, an alkoxy group with a carbon atom number of 1 to 12 and an aryl group with a carbon number of 6 to 24. Here, the hydrogen atom of each of the alkyl group, the alkoxy group and the aryl group may be substituted with a halogen atom.

$R^5$ is more preferably a substituent selected from the group consisting of an alkyl group with a carbon atom number of 1 to 12, an alkoxy group with a carbon atom number of 1 to 12 and an aryl group with a carbon number of 6 to 24. Here, the hydrogen atom of each of the alkyl group, the alkoxy group and the aryl group may be substituted with a halogen atom.

$R^4$ and $R^5$ may be the same or mutually different.

Examples of $R^4$ and $R^5$ may include methyl, ethyl, propyl, isopropyl, butyl, butyl, butyl, pentyl, hexyl, heptyl, octyl, nonyl, decyl, undecyl, dodecyl and halogen-substituted products thereof;

methoxy, ethoxy, propyloxy, pentyloxy, hexyloxy, heptyloxy, octyloxy, nonyloxy, decyloxy, undecyloxy, dodecyloxy and halogen-substituted products thereof; and phenyl, benzyl, tolyl, xylyl, biphenyl, naphthyl and halogen-substituted products thereof. The reason for this is unknown at the present time, but is thought to be that existence of an electron-donating group causes nickel atoms to have an electron-donating property, and due to their electronic state, interaction between the nickel atoms and the cyclic polyarylene sulfide tends to be relatively strong.

Further, $R^4$ and $R^5$ are each more preferably an alkyl group with a carbon number of 1 to 12 from the viewpoint of the steric stability of a nickel compound structure, and examples thereof may include methyl, ethyl, propyl, isopropyl, butyl, butyl, butyl, pentyl, hexyl, heptyl, octyl, nonyl, decyl, undecyl, dodecyl and halogen-substituted products thereof.

Among them, the methyl group is most preferred because both the electron-donating property and the steric stability of a nickel compound structure can be secured, and further, excellent availability and handling characteristics of a transition metal compound are ensured. That is, in the present invention, $R^4$ and $R^5$ are each especially preferably a methyl group.

Specific examples of the nickel compound may include bis(2,4-pentanedionato) nickel.

The nickel compound represented by the general formula (D) may be an anhydride, or may be a hydrate.

The reason why a nickel compound is effective is unknown at the present time, but is thought to be that nickel tends to have a relatively small atomic radius among transition metal atoms, or nickel atoms tend to strongly interact with a cyclic polyarylene sulfide structure, or nickel atoms are capable of forming a compound which is easily dispersed in a cyclic polyarylene sulfide.

The feature of the present invention consists in that a cyclic polyarylene sulfide is heated in the presence of a nickel compound represented by the general formula (D), and the nickel compound represented by the general formula (D) may be added as a raw material, or the nickel compound represented by the general formula (D) may be generated in the system. One nickel carboxylate compound may be used alone, or two or more nickel carboxylate compounds may be used in combination. Examples of the method for generating the nickel compound represented by the general formula (D) in the system as in the latter case include a method in which a nickel compound is generated from a nickel salt and acetyl acetone like a method that is used in a general method for synthesis of an acetyl acetate compound in a solution.

<Evaluation of Valence/Bonding/Dispersion State of Nickel Compound>

The valence state of nickel atoms, the state of bonding or coordination of nickel atoms to surrounding atoms, and the like can be known by performing, for example, X-ray absorption fine structure (XAFS) analysis, ESR spectral analysis or the like.

For example, in XAFS analysis, the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), each of which is used as a catalyst in an embodiment of the present invention, or cyclic polyarylene sulfides containing these compounds, or polyarylene sulfide resin compositions obtained by heating the cyclic polyarylene sulfides containing these compounds are irradiated with X rays, and the absorption spectra thereof are compared, whereby the state of nickel atoms can be known and the nickel atoms can be quantitatively determined.

For example, in ESR spectral analysis, the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), or cyclic polyarylene sulfides containing these compounds, or polyarylene sulfide resin compositions obtained by heating the cyclic polyarylene sulfides containing these compounds are subjected to ESR measurement, and the shapes and line widths of the spectra thereof are compared, whereby the valence state of the nickel atoms and the dispersion state of nickel fine particles can be known.

<Added Amount and Method for Addition of Nickel Compound Serving as Polymerization Catalyst and Nickel Fine Particle Source>

The concentration of each of the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), for use in the present invention, varies depending on the molecular weight of an intended polyarylene sulfide resin composition, the particle size of nickel fine particles, and the type of a nickel compound to be used, but normally, for example, the lower limit thereof may be preferably 0.001% by mole or more, more preferably 0.005% by mole or more, further preferably 0.01% by mole or more based on the amount of sulfur atoms in the cyclic polyarylene sulfide. When the above-mentioned concentration is 0.001% by mole or more, the cyclic polyarylene sulfide is sufficiently converted to the polyarylene sulfide. On the other hand, when the nickel content increases, dispersion of nickel particles becomes insufficient, so that nickel particles are easily aggregated, and therefore, for example, the upper limit of the above-mentioned concentration may be preferably 20% by mole or less, more preferably 15% by mole or less, further preferably 10% by mole or less based on the amount of sulfur atoms in the cyclic polyarylene sulfide. When the above-mentioned concentration is 20% by mole or less, a polyarylene sulfide and polyarylene sulfide resin composition having the above-mentioned properties can be obtained.

That is, the concentration of each of the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), for use in the present invention, is preferably 0.001 parts by mole or more, more preferably 0.005 parts by mole or more, further preferably 0.01 parts by mole or more, and preferably 20 parts by mole or less, more preferably 15 parts by mole or less, further preferably 10 parts by mole or less based on 100 parts by mole of the content (number) of sulfur atoms in the cyclic polyarylene sulfide.

The concentration of each of the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), as mentioned here, refers to the concentration of each of these compounds when they are added as raw materials. On the other hand, when each nickel compound is generated in the system, the concentration of the compound refers to the concentration of a nickel salt etc. that is added as a raw material.

The nickel carboxylate compound including nickel and a carboxylic acid structure represented by the general formula (A), the nickel carboxylate-amine complex including a primary amine and a nickel carboxylate compound represented by the general formula (C), the nickel compound represented by the general formula (D), or a nickel salt for generating each nickel compound in the system may be added as it is, but it is preferred to uniformly disperse the compound in the cyclic polyarylene sulfide. Examples of the method for uniformly dispersing the compound include a method including mechanically dispersing the compound, a method including dispersing the compound using a solvent, a method including melting the cyclic polyarylene sulfide to disperse the compound, and a method including dispersing the compound beforehand in an apparatus such as a polymerization reaction apparatus, or a mold, extruder or melt kneading machine for production of a molded article, or a method including dispersing the compound on a fibrous material beforehand in the case where the fibrous material is made to coexist during heating of the cyclic polyarylene sulfide.

Specific examples of the method including mechanically dispersing the compound may include methods using a grinder, a stirrer, a mixer, a shaker or a mortar.

Specific examples of the method including dispersing the compound using a solvent may include a method in which the cyclic polyarylene sulfide is dissolved or dispersed in an appropriate solvent, a predetermined amount of the nickel compound is added thereto, and the solvent is then removed.

Examples of the method including melting the cyclic polyarylene sulfide to disperse the compound may include a method in which each nickel compound or nickel salt is added to the solid cyclic polyarylene sulfide, and the cyclic polyarylene sulfide is then melted by heating, and a method in which the cyclic polyarylene sulfide is melted beforehand, and each nickel compound or nickel salt is then added.

Examples of the method including dispersing the compound beforehand in an apparatus such as a polymerization reaction apparatus, or a mold, extruder or melt kneading machine for production of a molded article may include a method in which the compound is dispersed as it is, and a method in which a predetermined amount of each nickel compound or nickel salt is added to an appropriate solvent, and the solvent is then removed to disperse the compound in the apparatus such as a polymerization reaction apparatus, or a mold, extruder or melt kneading machine for production of a molded article.

Examples of the method including dispersing the compound on a fibrous material beforehand may include a method in which the compound is dispersed as it is, and a method in which a predetermined amount of each nickel compound or nickel salt is added to an appropriate solvent, the mixture is then applied to, spread over or impregnated into a fibrous material, and the solvent is then removed to disperse the compound.

In the case where two or more compounds are added, depending on the stability or reactivity of the compounds to be added, they may be added all at once, or they may be added separately, and then mixed inside or outside the apparatus such as a polymerization reaction apparatus, or a mold, extruder or melt kneading machine for production of a molded article.

When each nickel compound or nickel salt is solid, the average particle size thereof is preferably 1 mm or less for making it possible to disperse the compound more uniformly, but is not necessarily required to fall within the range of 0.5 to 20 nm.

The nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), for use in the present invention tend to have higher stability as compared to, for example, a zero-valent nickel compound that is known as a polymerization catalyst. Thus, for example, bis(1,5-cyclooctadiene) nickel that is a zero-valent nickel compound tends to have a reduced effect of accelerating conversion of cyclic polyphenylene sulfide to polyphenylene sulfide unless it is used under a non-oxidizing atmosphere, whereas the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), for use in the present invention, are added preferably under a non-oxidizing atmosphere, but can also be added in the air.

The temperature during addition of the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), for use in the present invention, or a nickel salt for generating each nickel compound in the system is not particularly limited, but the upper limit thereof is preferably in a range of temperatures at which a cyclic polyarylene sulfide is hardly converted to a polyarylene sulfide. For example, the temperature may be 300° C. or lower, preferably 260° C. or lower, more preferably 240° C. or lower, further preferably 220° C. or lower, further more preferably 200° C. or lower, still further preferably 180° C. or lower. Depending on the type of a nickel compound to be used, the above-mentioned temperature is preferably in a range of temperatures at which the nickel compound hardly accelerates conversion of a cyclic polyarylene sulfide to a polyarylene sulfide.

<Conditions for Production of Polyarylene Sulfide Resin Composition>

The heating temperature during production of a polyarylene sulfide resin composition in the present invention is preferably a temperature at which a cyclic polyarylene sulfide is melted, and the heating temperature is not particularly limited as long as it is a temperature at which conversion of the cyclic polyarylene sulfide to the polyarylene sulfide is accelerated by means of the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), and an active nickel compound that is dispersed as fine particles is generated. However, when the heating temperature is equal to or lower than the melting temperature of the cyclic polyarylene sulfide, it tends to require a long time for conversion of the cyclic polyarylene sulfide to the polyarylene sulfide.

The temperature at which the cyclic polyarylene sulfide is melted varies depending on the composition or molecular weight of the cyclic polyarylene sulfide, or an environment during heating, and therefore cannot be uniquely specified, but the temperature can be known by, for example, analyzing the cyclic polyarylene sulfide using a differential scanning calorimeter. However, the temperature at which the cyclic polyarylene sulfide is melted generally ranges widely, and heat absorption associated with melting tends to continue even at a temperature equal to or higher than the melting point. Therefore, the heating temperature is preferably a temperature equal to or higher than the melting point of the cyclic polyarylene sulfide, and specifically, the heating temperature is preferably higher by 10° C. or more, more preferably higher by 20° C. or more, than the melting point of the cyclic polyarylene sulfide. The melting point can be measured using a differential scanning calorimeter. The temperature at which an active nickel compound is generated from the nickel carboxylate compound including nickel and a carboxylic acid structure represented by the general formula (A), the nickel carboxylate-amine complex including a primary amine and a nickel carboxylate compound represented by the general formula (C), or the nickel compound represented by the general formula (D) also varies depending on the type of each nickel compound or an environment during heating, and therefore cannot be uniquely specified, but the temperature can be known by analyzing each nickel compound using a thermogravimeter.

The lower limit of the heating temperature may be, for example, 180° C. or higher, and is preferably 200° C. or higher, more preferably 220° C. or higher, further preferably 240° C. or higher. When the heating temperature is in the above-mentioned range, the cyclic polyarylene sulfide is melted to facilitate compatibility of each nickel compound with the cyclic polyarylene sulfide, so that the decomposition reaction of each nickel compound is easily carried out, i.e. generation of an active nickel compound satisfactorily proceeds, leading to completion of the cyclic polyarylene sulfide to the arylene sulfide in a short time, and thus a polyarylene sulfide resin composition including nickel fine particles can be obtained. On the other hand, when the heating temperature is excessively high, an undesirable side reaction typified by a crosslinking reaction or a decomposition reaction tends to occur between cyclic polyarylene sulfides, between polyarylene sulfides generated by heating, between the polyarylene sulfide and the cyclic polyarylene sulfide, etc., so that the properties of the resulting polyarylene sulfide resin composition may be deteriorated, and therefore it is desirable to avoid a temperature at which such an undesirable side reaction evidently occurs. The upper limit of the heating temperature may be, for example, 400° C. or lower. When the heating temperature is in the above-mentioned range, it tends to be able to suppress adverse effects on the properties of the resulting polyarylene sulfide resin composition by an undesirable side reaction, and thus a polyarylene sulfide resin composition having the above-mentioned properties can be obtained. The heating temperature is preferably low because energy required for heating or cooling can be reduced, and the time can be shortened, leading to improvement of productivity. Accordingly, for example, the heating temperature may be preferably 400° C. or lower, more preferably 360° C. or lower, further preferably 320° C. or lower, further more preferably 300° C. or lower.

The atmosphere at the time of heating the cyclic polyarylene sulfide is preferably a non-oxidizing atmosphere. The non-oxidizing atmosphere refers to an atmosphere in which the concentration of oxygen in a gas phase that is in contact with the cyclic polyarylene sulfide is 5% by volume or less, preferably 2% by volume or less, and further preferably, substantially no oxygen exists, i.e. an inert gas atmosphere of nitrogen, helium, argon or the like, and in particular, a nitrogen atmosphere is preferred from the viewpoint of economy and ease of handling. Accordingly, it tends to be able to suppress occurrence of an undesirable side reaction such as a crosslinking reaction or a decomposition reaction between cyclic polyarylene sulfides, between polyarylene sulfides generated by heating, between the polyarylene sulfide and the cyclic polyarylene sulfide, etc., or an oxidation reaction of each nickel compound or the resulting active nickel compound.

The cyclic polyarylene sulfide can be heated either under the atmospheric pressure, or under a compressed condition above the atmospheric pressure, or under a decompressed condition, or under a degassing condition as long as it is heated under a non-oxidizing atmosphere.

The compressed condition above the atmospheric pressure is preferred in that the nickel compound as a polymerization catalyst and a nickel fine particle source is hardly volatilized, and the upper limit of the compressed condition is not particularly limited, but it is preferably 0.2 MPa or less from the viewpoint of ease of handling a reaction apparatus. In the case where the heating is performed under the condition of 50 kPa or more, it is preferred that the atmosphere in the reaction system is once set to a non-oxidizing atmosphere, and an intended compressed condition is then established. Accordingly, it tends to be able to suppress occurrence of an undesirable side reaction such as a crosslinking reaction or a decomposition reaction between cyclic polyarylene sulfides, between polyarylene sulfides generated by heating, between the polyarylene sulfide and the cyclic polyarylene sulfide, etc., or an oxidation reaction of each nickel compound or the resulting active nickel compound.

The term "under a decompressed condition" means that the inside of a system where a reaction is carried out has a pressure lower than the atmospheric pressure, and the upper limit thereof is preferably 50 kPa or less, more preferably 20 kPa or less, further preferably 10 kPa or less. The lower limit may be, for example, 0.1 kPa or more, and is more preferably 0.2 kPa or more. When the decompressed condition is not below the lower limit, the cyclic compound represented by the formula (S) contained in the cyclic polyarylene sulfide and having a low molecular weight tends to be hardly volatilized. On the other hand, when the decompressed condition is not above the preferred upper limit, a polyarylene sulfide oligomer contained in the cyclic polyarylene sulfide, components generated during the decomposition reaction by heating from the nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D), hydrated water contained in the nickel compound when each nickel compound is a hydrate, an amine compound when the nickel compound is the nickel carboxylate-amine complex including a primary amine and a nickel carboxylate compound represented by the general formula (C), and so on are easily removed from the inside of the heating system. The concentrations of a polyarylene sulfide oligomer in a molten raw material, a decomposition product component, hydrated water, an amine compound and so on decrease, and a decomposition reaction by heating, associated generation of an active nickel compound, and removal of the polyarylene sulfide oligomer contained in the cyclic polyarylene sulfide from the heating system can be more efficiently performed. Accordingly, a polyarylene sulfide resin having a larger weight average molecular weight can be obtained, and occurrence of a side reaction can be suppressed.

The term "under a degassing condition" refers to a condition for removing from the heating system a gaseous component generated during heating of the cyclic polyarylene sulfide in the presence of nickel carboxylate compound including nickel and a carboxylic acid structure represented by the general formula (A), the nickel carboxylate-amine complex including a primary amine and a nickel carboxylate compound represented by the general formula (C) and the nickel compound represented by the general formula (D). The gaseous component varies for whether or not the gaseous component is generated, or the degree of generation thereof, depending on the properties of the polyarylene sulfide oligomer contained in the cyclic polyarylene sulfide and respective nickel compounds, and details of the degassing condition, and examples of the gaseous component may include a component generated from the nickel compound during decomposition reaction by heating, hydrated water when each nickel compound is a hydrate, and an amine compound when the nickel compound is the nickel carboxylate-amine complex including a primary amine and a nickel carboxylate compound represented by the general formula (C).

The above-mentioned condition is not particularly limited as long as the resulting gaseous component can be removed from the inside of the heating system, and examples thereof include a condition for degassing under a continuously decompressed condition, a condition for continuously introducing a gas into the system and discharging the resulting gaseous component along with the introduced gas, and a condition for cooling the resulting gaseous component and collecting the component outside the system. By performing under degassing condition, for example, a polyarylene sulfide oligomer contained in the cyclic polyarylene sulfide, a component generated from the nickel compound during decomposition reaction by heating, hydrated water when each nickel compound is a hydrate, an amine compound when the nickel compound is the nickel carboxylate-amine complex including a primary amine and a nickel carboxylate compound represented by the general formula (C), and so on are easily removed from the inside, of the heating system, and further, the concentrations of the polyarylene sulfide oligomer in the molten raw material, the decomposition product component, hydrated water, the amine compound and so on decrease. As a result, the decomposition reaction by heating, associated generation of an active nickel compound, and removal of the polyarylene sulfide oligomer contained in the cyclic polyarylene sulfide from the heating system can be accelerated. As a result, a polyarylene sulfide resin having a larger weight average molecular weight can be obtained, and occurrence of a side reaction can be suppressed.

The continuously decompressed condition in degassing under the continuously decompressed condition is not limited as long as the resulting gaseous component can be removed from the heating system, and for example, the whole of the inside of the system where heating is performed may be continuously decompressed, or in the case where heating is performed using a mold, extruder or melt kneading machine for production of a molded article, the inside of the mold, extruder or melt kneading machine at normal pressure or under a compressed condition may be partially connected to a decompression apparatus, and continuously decompressed. However, when the inside of, for example, a polymerization system is continuously decompressed to degassed rather than being sealed and heated under a decompressed condition, the concentrations of a polyarylene sulfide oligomer in the molten raw material, a decomposition product component, hydrated water, an amine compound and so on are more easily decreased, and further, a decomposition reaction by heating, associated generation of an active nickel compound, and removal of the polyarylene sulfide oligomer contained in the cyclic polyarylene sulfide from the heating system can be more efficiently performed. As a result, a polyarylene sulfide resin having a larger weight average molecular weight can be obtained, and occurrence of a side reaction can be suppressed.

In the case where the system is continuously decompressed, it is preferred that the atmosphere in the reaction system is once set to a non-oxidizing atmosphere, and a decompressed condition is then established. Accordingly, it tends to be able to suppress occurrence of an undesirable side reaction such as a crosslinking reaction or a decomposition reaction between cyclic polyarylene sulfides, between polyarylene sulfides generated by heating, between the polyarylene sulfide and the cyclic polyarylene sulfide, etc., or an oxidation reaction of each nickel compound or the resulting active nickel compound.

In the condition for continuously introducing a gas into the system and discharging the resulting gaseous component to outside the heating system along with the introduced gas, the atmosphere in the reaction system is preferably a non-oxidizing atmosphere. Accordingly, it tends to be able to suppress occurrence of an undesirable side reaction such as a crosslinking reaction or a decomposition reaction between cyclic polyarylene sulfides, between polyarylene sulfides generated by heating, between the polyarylene sulfide and the cyclic polyarylene sulfide, etc., or an oxidation reaction of each nickel compound or the resulting active nickel compound. The gas to be used is preferably an inert gas such as nitrogen, helium or argon, and among them, a nitrogen gas is especially preferred from the viewpoint of economy and ease of handling.

The temperature of a gas introduced into the system, which depends on the flow rate of the introduced gas, the heating temperature in the system and the structure of a reaction system, is not particularly limited as long as it is in a range which ensures that the heating temperature in the system can be stably controlled. However, the temperature of the gas introduced into the system may be, for example, preferably 0° C. or higher, more preferably 20° C. or higher, further preferably 50° C. or higher for stably controlling the gas temperature, and preferably 100° C. or higher, more preferably 150° C. or higher, further preferably 180° C. or higher, further more preferably a temperature equal to the heating temperature in the system for stably controlling the heating temperature in the system.

The flow rate of a gas introduced into the system, which depends on the temperature of the introduced gas, the heating temperature in the system and the structure of a reaction system, is not particularly limited as long as it is in a range which ensures that a gaseous component generated at the time of heating the cyclic polyarylene sulfide in the presence of each nickel compound can be removed from the inside of the heating system, and the heating temperature in the system can be stably controlled. However, from the viewpoint of the effect of removing from the heating system a gaseous component generated at the time of heating the cyclic polyarylene sulfide in the presence of each nickel compound, the flow rate of the gas introduced into the system per minute may be, for example, preferably 1% or more, more preferably 5% or more, further preferably 10% or more, further more preferably 20% or more of the volume of the inside of the system.

The amount of the resulting gaseous component removed from the inside of the system by degassing can be known using a method including collecting components removed outside the heating system and weighing the components, a method including calculating the amount from a difference in weight before and after heating, and calculating the amount of remaining components from a weight loss of the resulting polyarylene sulfide in heating, and subtracting the calculated value.

In an embodiment of the present invention, the above-mentioned effect (hereinafter, may be referred to as a "common effect obtained by performing heating under a degassing condition") is exhibited by performing heating under a degassing condition. Further, in the case where the cyclic polyarylene sulfide is heated in the presence of the compound (i) or (ii), the following effect is exhibited in addition to the above-mentioned effect.

That is, by heating the cyclic polyarylene sulfide in the presence of the compound (i) or (ii) and under a degassing condition, the conversion of the cyclic polyarylene sulfide to the polyarylene sulfide can be further increased.

Therefore, in the case where the cyclic polyarylene sulfide is heated in the presence of the compound (i) or (ii), it is preferred to perform the heating under a degassing condition.

On the other hand, in the case where the cyclic polyarylene sulfide is heated in the presence of the compound (iii), the conversion of the cyclic polyarylene sulfide to the polyarylene sulfide when the heating is performed under a degassing condition is almost the same as that when the heating is performed under a pressure condition not below normal pressure (atmospheric pressure). Therefore, in an embodiment of the present invention, one feature of the aspect of heating the cyclic polyarylene sulfide in the presence of the compound (iii) consists in that a high conversion can be kept independently of the pressure condition during heating. It is to be noted that in the aspect of heating the cyclic polyarylene sulfide in the presence of the compound (iii), heating under a degassing condition is not hindered while a "common effect obtained by performing heating under a degassing condition" is exhibited by performing heating under a degassing condition.

The reaction time varies depending on conditions such as the content, repetition number m, molecular weight and the like of a cyclic compound represented by the formula (S) in the cyclic polyarylene sulfide to be used, the type of a nickel compound to be used as a polymerization catalyst and a nickel fine particle source, the particle size of the nickel fine particles, and the heating temperature, and therefore cannot be uniquely defined, but it is preferred to set the reaction time so as to prevent occurrence of the undesirable side reaction where possible. The lower limit of the heating time may be, for example, 0.01 hours or more, preferably 0.05 hours or more. When the heating time is 0.01 hours or more, the cyclic polyarylene sulfide can be converted to the polyarylene sulfide. On the other hand, the upper limit may be, for examples, 100 hours or less, preferably 20 hours or less, more preferably 10 hours or less. According to the preferred production method of the present invention, heating of the cyclic polyarylene sulfide can be performed in 2 hours or less. The heating time may be, for example, 2 hours or less, 1 hour or less, 0.5 hours or less, 0.3 hours or less, or 0.2 hours or less. When the heating time is 100 hours or less, it tends to be able to suppress adverse effects on the properties of the resulting polyarylene sulfide by an undesirable side reaction.

The cyclic polyarylene sulfide can also be heated under a substantially solvent-free condition. In the case where the heating is performed under the above-mentioned condition, the temperature can be raised in a short time, and the reaction rate increases, so that a polyarylene sulfide resin composition tends to be easily produced in a short time. Therefore, in the present invention, it is preferred to perform heating under a substantially solvent-free condition. Here, the substantially solvent-free condition means that the content of a solvent in the cyclic polyarylene sulfide is 10% by weight or less, preferably 3% by weight or less.

The apparatus to be used for the heating is not particularly limited as long as it is an apparatus provided with a heating mechanism. For example, the heating may be performed by a method using a usual polymerization reaction apparatus as a matter of course, or may be performed in a mold for production of a molded article, or may be performed using an extruder or a melt kneading machine. For the heating a known method such as a batch method or a continuous method can be employed. The use of an apparatus provided with a degassing mechanism is more preferred.

The cyclic polyarylene sulfide can also be heated in the coexistence of a fibrous material. Here, the fibrous material refers to a fine thread-like material, and is preferably any material having a long and narrow extended structure like natural fibers. When the cyclic polyarylene sulfide is converted to the polyarylene sulfide in the presence of a fibrous material, a composite material structure composed of a polyarylene sulfide resin composition and a fibrous material can be easily prepared. The structure is reinforced by the fibrous material, and therefore tends to be superior in, for example, mechanical properties as compared to a polyarylene sulfide resin composition alone.

Here, it is preferred that among various fibrous materials, reinforcing fibers composed of long fibers are used, so that the polyarylene sulfide resin composition can be highly reinforced. Generally, in preparation of a composite material structure composed of a resin and a fibrous material, it is often the case that expected mechanical physical properties are not exhibited. For example, wetting between the resin and the fibrous material tends to be deteriorated because the resin has a high viscosity in a molten state, and thus a homogeneous composite material cannot be formed. Here, the wetting means that a fluid material such as a molten resin and a solid matrix such as a fibrous compound are in contact with each other in a satisfactory physical state and a sustained manner so that air or other gas is not substantially trapped between the fluid material and the solid matrix. Here, as the viscosity of the fluid material decreases, wetting with the fibrous material tends to be improved. The cyclic polyarylene sulfide in the present invention can have a remarkably low viscosity in a molten state as compared to a general thermoplastic resin, for example a polyarylene sulfide, and is therefore easily wetted with the fibrous material satisfactorily. In the method for producing a polyarylene sulfide resin composition according to an embodiment of the present invention, the cyclic polyarylene sulfide is converted to a polyarylene sulfide after the cyclic polyarylene sulfide and the fibrous material establish satisfactory wetting, and therefore a composite material structure with a fibrous material and a polyarylene sulfide resin composition establishing satisfactory wetting can be easily obtained.

As a fibrous material, reinforcing fibers composed of long fibers are preferred as described above, and reinforcing fibers for use in the present invention are not particularly limited, but reinforcing fibers that are suitably used are generally fibers with satisfactory heat resistance and tensile strength, which are used as high-performance reinforcing fibers. Examples of the reinforcing fibers include glass fibers, carbon fibers, graphite fibers, aramid fibers, silicon carbide fibers, alumina fibers and boron fibers. Among them, most satisfactory fibers may be, for example, carbon fibers and graphite fibers which have a satisfactory specific strength and specific elastic modulus and can significantly contribute to weight reduction. For carbon fibers or graphite fibers, any kind of carbon fibers or graphite fibers can be used according to a use purpose, but high-strength and high-elongation having a tensile strength of 450 kgf/mm$^2$ or more and a tensile elongation of 1.6% or more is most suitable. In the case where long reinforcing fibers are used, the length thereof is preferably 5 cm or more. When the length of the reinforcing fibers is in this range, the strength of the reinforcing fibers is easily exhibited sufficiently as a composite material. Carbon fibers and graphite fibers may be used in combination with other reinforcing fibers. The reinforcing fibers are not limited for their shape and arrangement, and for example, those that are arranged in a single direction or a random direction, or in the form of a sheet, a mat, a fabric or a braid can be used. Particularly, for applications in which a high specific strength and specific elastic modulus are required, an arrangement with reinforcing fibers aligned in a single direction is most suitable, but an arrangement in the form of a cloth (fabric), which ensures easy handling, is also suitable for the present invention.

It is also possible to perform the conversion of the cyclic polyarylene sulfide to the polyarylene sulfide in the presence of a filler. Examples of the filler include nonfibrous glass, nonfibrous carbon, and inorganic fillers such as calcium carbonate, titanium oxide and alumina.

EXAMPLES

Hereinafter, the present invention will be described in detail by way of examples. These examples are illustrative, and are not restrictive.

<Measurement of Molecular Weight>

For the molecular weight of each of a polyarylene sulfide and a cyclic polyarylene sulfide, a number average molecular weight (Mn) and a weight average molecular weight (Mw) were calculated in terms of polystyrene by gel permeation chromatography (GPC), a type of size exclusion chromatography (SEC). Measurement conditions in GPC are shown below.

Apparatus: SSC-7110 from Senshu Scientific Co.
Name of column: Shodex UT806M×2
Eluent: 1-chloronaphthalene
Detector: differential refractive index detector
Column temperature: 210° C.
Pre-thermostatic bath temperature: 250° C.
Pump thermostatic bath temperature: 50° C.
Detector temperature: 210° C.
Flow rate: 1.0 mL/min
Sample injection amount: 300 μL (slurry: about 0.2% by weight)

<Measurement of Conversion>

The conversion of cyclic polyphenylene sulfide to polyphenylene sulfide were calculated in accordance with the following method using high-performance liquid chromatography (HPLC).

About 10 mg of a product obtained by heating a cyclic polyarylene sulfide was dissolved in about 5 g of 1-chloronaphthalene at 250° C. The solution was cooled to room temperature, and resultantly a precipitate was generated. A 1-chloronaphthalene-insoluble component was filtered using a membrane filter with a pore diameter of 0.45 μm, so that a 1-chloronaphthalene-soluble component was obtained. The amount of an unreacted cyclic polyarylene sulfide was quantitatively determined by HPLC measurement of the obtained soluble component, and the conversion of the cyclic polyarylene sulfide to the polyarylene sulfide was calculated. Measurement conditions in HPLC are shown below.

Apparatus: LC-10 Avp series manufactured by Shimadzu Corporation
Column: Mightysil RP-18 GP150-4.6 (5 μm)
Detector: photodiode array detector (UV=270 nm)

<Measurement of Weight Loss Ratio in Heating>

The weight loss ratio of a polyarylene sulfide in heating was measured under the following conditions using a thermogravimetric analysis apparatus. As a sample, a fine grain material of 2 mm or less was used.

Apparatus: TGA 7 manufactured by Perkin Elmer Co.
Measurement atmosphere: under nitrogen gas stream
Sample charge amount: about 10 mg
Measurement Conditions:

(a) holding at a programmed temperature of 50° C. for 1 minute (b) heating from a programmed temperature of 50° C. to 350° C. (temperature rise rate: 20° C./minute)

The weight loss ratio ΔWr is a value determined from a sample weight (W2) at the time when the temperature reaches 330° C. with respect to a sample weight (W1) at the time when the temperature reaches 100° C. using the following formula in heating under the condition (b).

$$\Delta Wr = (W1-W2)/W1 \times 100 (\%)$$

<Calculation of Particle Size of Nickel Fine Particles and Coefficient of Variation Thereof by Observation with Transmission Electron Microscope (TEM)>

An ultrathin section of a polyphenylene sulfide resin composition was prepared using Ultramicrotom (apparatus: EMUC 7 manufactured by Leica Co.), and observed with a transmission electron microscope (apparatus: H-7100 manufactured by Hitachi, Ltd.) to examine the dispersion state of nickel fine particles in the polyphenylene sulfide resin. That is, the polyarylene sulfide resin composition was observed at a magnification of 20,000, and an observation image of an observed region with a size of about 1 μm square (1 μm×1 μm) was obtained. The obtained observation image was enlarged so that the region of about 1 μm square (1 μm×1 μm) (observation object region) was scaled up to a size of not less than about 20 cm square (20 cm×20 cm) and not more than about 40 cm square (40 cm×40 cm) in the observation image. Hundred particles were then randomly extracted from the enlarged observation image, a value obtained by averaging a sum of the lengths of the major axis and the minor axis for each of the particles was defined as a representative particle size, and the number average of the representative particle sizes of the particles was calculated as an average particle size.

In the case where 100 particles were unable to be extracted from the image after the observation object region of about 1 μm square was scaled up to a size of not less than about 20 cm square and not more than 40 cm square, a wider region was observed and an observation image was obtained. The observation image was then enlarged so that the observed region was scaled up to a size of not less than about 20 cm square and not more than about 40 cm square in the observation image. Hundred particles were then randomly extracted from the enlarged observation image, and the number average of the representative particle sizes of the particles was calculated as an average particle size.

The coefficient of variation indicating a variation in particle size of nickel fine particles was calculated in accordance with the following formula from an average particle size calculated as described above, and a standard deviation of the representative particle sizes of 100 nickel fine particles used for calculation of the average particle size.

coefficient of variation=standard deviation/average particle size×100(%)

<Infrared Spectroscopic Analysis>
Apparatus: Perkin Elmer System 2000 FT-IR
Sample preparation: KBr method
<Measurement of Tensile Elongation (Elongation at Break)>

The tensile elongation was measured in accordance with the following method.

A polyarylene sulfide resin composition or a polyarylene sulfide and a spacer were disposed between molds of a pressing machine set at 340° C., and were heated at 340° C. for 4 minutes while a pressure of about 40 kgf/cm$^2$ was applied. Thereafter, the melted product of the polyarylene sulfide resin composition or the polyarylene sulfide was immediately transferred to between molds of a pressing machine set at 150° C., and an annealing treatment was performed for 5 minutes to obtain a crystallized film.

A dumbbell-shaped sample having a width of 5 mm, a gauge length of 10 mm, a total length of 50 mm and a thickness of about 0.2 mm was prepared from the crystallized film using a punching apparatus. The tensile elongation of the sample was determined by a tensile test. Measurement conditions in the tensile test are shown below. The average of the results of three measurements was determined with the maximum value and the minimum value excluded from the results of five measurements.

Apparatus: tensile tester manufactured by Orientec Co., Ltd. (Tensilon UTA-2.5T)
Tension speed: 10%/minute (1 mm/minute)
Chuck-to-chuck distance: 25 mm Reference Example 1 Preparation of Cyclic Polyarylene Sulfide In a stainless autoclave provided with an agitator were added 28.06 g (0.240 mol) of a 48 wt % aqueous solution of sodium hydrosulfide, 21.88 g (0.252 mol) of a 48 wt % aqueous solution prepared using 96% sodium hydroxide, 615.0 g (6.20 mol) of N-methyl-2-pyrrolidone (NMP) and 36.16 g (0.246 mol) of p-dichlorobenzene (p-DCB). The inside of a reaction vessel was sufficiently purged with nitrogen, and then hermetically sealed under a nitrogen gas.

The mixture was heated from room temperature to 200° C. for about 1 hour while being agitated at 400 rpm. The mixture was then heated from 200° C. to 250° C. for about 30 minutes. The mixture was held at 250° C. for 2 hours, and then rapidly cooled to a temperature close to room temperature, and contents were then collected.

The obtained contents (500 g) were diluted with about 1500 g of ion exchanged water, and then filtered with a glass filter with an average aperture of 10 to 16 μm. A filter-on component was dispersed in 300 g of ion exchanged water, the dispersion was agitated at 70° C. for 30 minutes, and the same filtration operation as described above was performed again total three times to obtain a white solid. The obtained white solid was vacuum-dried at 80° C. over night to obtain a dried solid.

The obtained solid was added in a cylindrical filter paper, and subjected to Soxhlet extraction for about 5 hours using chloroform as a solvent, so that a low-molecular-weight component contained in the solid was separated.

The solvent was removed from an extract obtained in the chloroform extraction operation, about 5 g of chloroform was added to prepare a slurry, and the slurry was added dropwise to about 600 g of methanol while the mixture was agitated. The resulting precipitate was filtered and collected, and vacuum-dried at 70° C. for 5 hours to obtain a white powder. From an absorption spectrum in infrared spectroscopic analysis, the white powder was confirmed to be a compound including phenylene sulfide units. From mass spectral analysis of components resulting from component separation by high-performance liquid chromatography (apparatus: M-1200H manufactured by Hitachi, Ltd.), and further from molecular weight information in MALDI-TOF-MS, the white powder was found to be cyclic polyphenylene sulfide which contained about 96% by weight of a cyclic compound having a p-phenylene sulfide unit as a main constituent unit and having a repetition unit number of 4 to 13 and which would be suitably used for production of a polyarylene sulfide in the present invention. The result of performing GPC measurement showed that the cyclic polyphenylene sulfide was fully dissolved in 1-chloronaphthalene at room temperature and had a weight average molecular weight of 900.

Reference Example 2 Synthesis of Polyphenylene Sulfide Resin

In an autoclave were added 118 g (1 mol) of a 47 wt % aqueous sodium hydrosulfide solution, 42.9 g (1.03 mol) of 96% sodium hydroxide, 162 g (1.64 mol) of N-methyl-2-pyrrolidone (NMP), 28.8 g (0.35 mol) of sodium acetate and 150 g of ion exchanged water, and the mixture was gradually heated to 235° C. for 3 hours while nitrogen was introduced at normal pressure, so that 213 g of water and 4.0 g (40.4 mmol) of NMP were distilled away, followed by cooling the reaction vessel to 160° C. The scattered amount of hydrogen sulfide was 25 mmol.

Next, 148 g (1.01 mol) of p-dichlorobenzene (p-DCB) and 131 g (1.33 mol) of NMP were further added, and the reaction vessel was hermetically sealed under a nitrogen gas. The mixture was heated at a rate of 0.6° C./minute from 200° C. to 270° C. while being agitated at 400 rpm, and the reaction was continued at 270° C. for 140 minutes. Thereafter, 33.3 g (1.85 mol) of water was injected into the system while the mixture was cooled to 240° C. over 20 minutes, and the mixture was then cooled at a rate of 0.4° C./minute from 240° C. to 210° C. Thereafter, the mixture was rapidly cooled to a temperature close to room temperature.

The contents were taken out, diluted with 400 ml of NMP, and then separated into a solvent and a solid using a sieve (80 mesh). The obtained particles were washed again with 480 ml of NMP at 85° C. Thereafter, the particles were washed with 840 ml of hot water five times, and separated by filtration to obtain a granular PPS polymer. The PPS polymer was heated at 150° C. for 5 hours under a nitrogen stream, and then dried at 150° C. under reduced pressure over night.

The obtained PPS was found to have a weight average molecular weight of 55,000 and a polydispersity of 3.8. The result of measuring the weight loss ratio of the obtained product in heating showed that the weight loss ratio ΔWr was 0.25%.

Reference Example 3 Preparation of Nickel Formate Anhydride

In a glass ampoule in the air was added 300 mg of nickel formate dihydrate ($Ni(HCOO)_2 \cdot 2H_2O$ (manufactured by Wako Pure Chemical Industries, Ltd.), and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 150° C., the inside of the ampoule was heated for 30 minutes while being kept at a pressure of about 0.4 kPa and degassed by a vacuum pump, and the ampoule was then taken out, and cooled to room temperature to obtain a light green solid. In absorption spectrum in infrared spectroscopic analysis of the solid, a peak at 3100 to 3400 $cm^{-1}$ originating from O—H of hydrated water of nickel formate dihydrate disappeared, and thus the solid was confirmed to be nickel formate anhydride.

Reference Example 4 Preparation of bis(stearylamine)-nickel Formate

Here, preparation of bis(stearylamine)-nickel formate as described in Japanese Patent Laid-open Publication No. 2010-64983 and International Publication No. WO 2011/115213 is described. In a 20 mL test tube were sequentially weighed 0.553 g (2.99 mmol) of nickel formate dihydrate ($Ni(HCOO)_2 \cdot 2H_2O$ (manufactured by Wako Pure Chemical Industries, Ltd.) and 1.6133 g (5.99 mmol) of stearylamine, and a three-way cock was attached to the 20 mL test tube. The operation that the inside of the test tube was decompressed by a vacuum pump, and then purged with nitrogen was repeated three times. The test tube was placed in an oil bath heated to 140° C. beforehand, and was heated for 30 minutes, and the test tube was taken out from the oil bath, and allowed to cool under nitrogen to obtain a light blue solid. In an absorption spectrum in infrared spectroscopic analysis of the solid, it was found that a peak at 3100 to 3400 $cm^{-1}$ originating from O—H of hydrated water of nickel formate disappeared, and instead, a sharp peak existed at each of the positions of 2950 to 2850 $cm^{-1}$ based on stretching vibrations of the aliphatic C—H group, 3325 $cm^{-1}$ and 3283 $cm^{-1}$ based on N—H stretching vibrations and 1630 $cm^{-1}$ based on bending vibrations of the N—H group, and thus it was confirmed that the amine was coordinated to nickel.

Reference Example 5 Preparation of bis(dodecylamine)-nickel Formate

Bis(dodecylamine)-nickel formate was prepared by a method similar to that in Reference Example 4. In a 20 mL test tube were sequentially weighed 0.932 g (5.04 mmol) of nickel formate dihydrate ($Ni(HCOO)_2 \cdot 2H_2O$ (manufactured by Wako Pure Chemical Industries, Ltd.) and 1.870 g (10.08 mmol) of dodecylamine, and a three-way cock was attached to the 20 mL test tube. The operation that the inside of the test tube was decompressed by a vacuum pump, and then purged with nitrogen was repeated three times. The test tube was placed in an oil bath heated to 140° C. beforehand, and was heated for 30 minutes, and the test tube was taken out from the oil bath, and allowed to cool under nitrogen to obtain a light blue solid. In an absorption spectrum in infrared spectroscopic analysis of the solid, it was found that a peak at 3100 to 3400 $cm^{-1}$ originating from O—H of hydrated water originating from nickel formate dihydrate disappeared, and instead, a sharp peak existed at each of the positions of 2950 to 2850 $cm^{-1}$ based on stretching vibrations of the aliphatic C—H group, 3325 $cm^{-1}$ and 3283 $cm^{-1}$ based on N—H stretching vibrations and 1630 $cm^{-1}$ based on bending vibrations of the N—H group, and thus it was confirmed that the amine was coordinated to nickel.

Reference Example 6 Preparation of bis(octylamine)-nickel Formate

Bis(dodecylamine)-nickel formate was prepared by a method similar to that in Reference Example 4. In a 20 mL test tube were sequentially weighed 0.766 g (4.14 mmol) of nickel formate dihydrate ($Ni(HCOO)_2 \cdot 2H_2O$ (manufactured by Wako Pure Chemical Industries, Ltd.) and 1.07 g (8.28 mmol) of octylamine, and a three-way cock was attached to the 20 mL test tube. The inside of test tube was sufficiently purged with nitrogen. The test tube was placed in an oil bath heated to 140° C. beforehand, and was heated for 30 minutes, and the test tube was taken out from the oil bath, and allowed to cool under nitrogen to obtain a light green solid. In an absorption spectrum in infrared spectroscopic analysis of the solid, it was found that a peak at 3100 to 3400 $cm^{-1}$ originating from O—H of hydrated water originating from nickel formate dihydrate disappeared, and instead, a sharp peak existed at each of the positions of 2950 to 2850 $cm^{-1}$ based on stretching vibrations of the aliphatic C—H group, 3325 $cm^{-1}$ and 3283 $cm^{-1}$ based on N—H stretching vibrations and 1630 $cm^{-1}$ based on bending vibrations of the N—H group, and thus it was confirmed that the amine was coordinated to nickel.

Example 1

Nickel formate dihydrate (manufactured by Wako Pure Chemical Industries, Ltd.; described as $Ni(HCOO)_2 \cdot 2H_2O$ in the table; the same hereinafter) stored under a nitrogen atmosphere was mixed under a nitrogen atmosphere with the cyclic polyphenylene sulfide obtained in Reference Example 1, the amount of the nickel formate dihydrate being 1% by mole based on the amount of sulfur atoms in the cyclic polyphenylene sulfide, (i.e. 1 part by mole of nickel formate dihydrate based on 100 parts by mole of the content of sulfur atoms (the number of sulfur atoms) in the cyclic polyphenylene sulfide was mixed under a nitrogen atmosphere), 300 mg of the mixed powder was added in a glass ampoule, and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 300° C., the inside of the ampoule was heated for 10 minutes while being kept at a pressure of about 0.4 kPa and degassed by a vacuum pump, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 70%. The result of GPC measurement showed that a peak originating from the cyclic polyphenylene sulfide and a peak from the generated polymer (PPS) existed, and the obtained PPS was found to have a weight average molecular weight of 90,000 and a polydispersity of 2.2. The result of measuring the weight loss ratio of the obtained product in heating showed that the weight loss ratio $\Delta Wr$ was 0.04%. Further, the TEM image of the obtained solid (size of observation object region: 1 μm×1.2 μm) was as shown in FIG. 1, and the nickel particles had an average particle size of 11.7 nm and a coefficient of variation of 53.1%. The results are shown in Table 1.

On the other hand, the glass ampoule was placed in an electric furnace with the temperature adjusted to 300° C. while the inside of the ampoule was kept at a pressure of about 0.4 kPa, and the temperature of the inside of the ampoule was measured. The result showed that the temperature reached 260° C. after 3 minutes, 290° C. after 4 minutes and 300° C. after 5 minutes after the ampoule was placed in the electric furnace, and after that, the temperature was unchanged.

Example 2

Except that the nickel formate anhydride in Reference Example 3 was used in place of the nickel formate dihydrate used in Example 1, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 84%. The result of GPC measurement showed that a peak originating from the cyclic polyphenylene sulfide and a peak from the generated polymer (PPS) existed, and the obtained PPS was found to have a weight average molecular weight of 103,000 and a polydispersity of 2.5. The result of measuring the weight loss ratio of the obtained product in heating showed that the weight loss ratio $\Delta Wr$ was 0.12%. Further, the TEM image of the obtained solid (size of observation object region: 1 μm×1.2 μm) was as shown in FIG. 2, and the nickel particles had an average particle size of 13.5 nm and a coefficient of variation of 37.1%. The results are shown in Table 1.

Example 3

Except that the bis(stearylamine)-nickel formate in Reference Example 4 was used in place of the nickel formate dihydrate used in Example 1, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 93%. The result of GPC measurement showed that a peak originating from the cyclic polyphenylene sulfide and a peak from the generated polymer (PPS) existed, and the obtained PPS was found to have a weight average molecular weight of 71,000 and a polydispersity of 2.5. The result of measuring the weight loss ratio of the obtained product in heating showed that the weight loss ratio $\Delta Wr$ was 0.10%. Further, the TEM image of the obtained solid (size of observation object region: 1 μm×1.2 μm) was as shown in FIG. 3, and the nickel particles had an average particle size of 9.0 nm and a coefficient of variation of 43.5%. The results are shown in Table 1.

Example 4

Except that the bis(dodecylamine)-nickel formate in Reference Example 5 was used in place of the nickel formate dihydrate used in Example 1, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 83%. The result of GPC measurement showed that a peak originating from the cyclic polyphenylene sulfide and a peak from the generated polymer (PPS) existed, and the obtained PPS was found to have a weight average molecular weight of 80,000 and a polydispersity of 2.2. The result of measuring the weight loss ratio of the obtained product in heating showed that the weight loss ratio $\Delta Wr$ was 0.03%. Further, the TEM image of the obtained solid (size of observation object region: 1 μm×1 μm) was as shown in FIG. 4, and the nickel particles had an average particle size of 10.4 nm and a coefficient of variation of 64.8%. The results are shown in Table 1.

Example 5

Except that unopened bis(2,4-pentanedionato) nickel (described as Ni(acac)$_2$ in the table; the same hereinafter) tightly sealed under an inert atmosphere was used in place of the nickel formate dihydrate used in Example 1, and the heating time was 60 minutes, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 89%. The result of GPC measurement showed that a peak originating from the cyclic polyphenylene sulfide and a peak from the generated polymer (PPS) existed, and the obtained PPS was found to have a weight average molecular weight of 110,000 and a polydispersity of 2.5. The result of measuring the weight loss ratio of the obtained product in heating showed that the weight loss ratio $\Delta Wr$ was 0.09%. Further, the TEM image of the obtained product (size of observation object region: 1 μm×1 μm) was as shown in FIG. 5, and the nickel particles had an average particle size of 8.2 nm and a coefficient of variation of 44.6%. The results are shown in Table 1.

Comparative Example 1

Except that tetrakis(triphenylphosphin) nickel (described as Ni(tpp)$_4$ in the table; the same hereinafter) was used in place of the bis(2.4-pentanedionato) nickel used in Example 5, the same procedure as in Example 5 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 72%. Further, the TEM image of the obtained solid observed at a magnification of 10,000 so that it would be able to extract 100 or more particles from the observation image (size of observation object region: 2 μm×2.4 μm) was as shown in FIG. 6, and the nickel particles had an average particle size of 23.0 nm and a coefficient of variation of 60.4%. The results are shown in Table 1.

but the insoluble part was found to be a nickel compound rather than a compound including a phenylene sulfide structure, and the generated PPS component was soluble. The result of HPLC measurement showed that the conversion of the cyclic polyphenylene sulfide to the PPS was 44%. Further, the TEM image of the obtained solid observed at a magnification of 10,000 so that it would be able to extract 100 or more particles from the observation image (size of observation object region: 2 μm×2.4 μm) was as shown in FIG. 7, and the nickel particles had an average particle size of 28.8 nm and a coefficient of variation of 60.1%. A visually observable coarse nickel aggregate existed in the obtained solid. The results are shown in Table 1.

TABLE 1

| | Nickel compound species | Amount of catalyst (mol %) | Temperature (° C.) | Time (minutes) | | Degassing |
|---|---|---|---|---|---|---|
| Example 1 | $Ni(HCOO)_2 \cdot 2H_2O$ | 1 | 300 | 10 | Done | Continuous decompression (0.4 kPa) |
| Example 2 | $Ni(HCOO)_2$ | 1 | 300 | 10 | Done | Continuous decompression (0.4 kPa) |
| Example 3 | $Ni(HCOO)_2 \cdot 2CH_3(CH_2)_{17}NH_2$ | 1 | 300 | 10 | Done | Continuous decompression (0.4 kPa) |
| Example 4 | $Ni(HCOO)_2 \cdot 2CH_3(CH_2)_{11}NH_2$ | 1 | 300 | 10 | Done | Continuous decompression (0.4 kPa) |
| Example 5 | $Ni(acac)_2$ | 1 | 300 | 60 | Done | Continuous decompression (0.4 kPa) |
| Comparative Example 1 | $Ni(tpp)_4$ | 1 | 300 | 60 | Done | Continuous decompression (0.4 kPa) |
| Comparative Example 2 | $NiCl_2$ | 1 | 300 | 60 | Done | Continuous decompression (0.4 kPa) |

| | Conversion (%) | Mw | Mw/Mn | ΔWr (%) | Average particle size (nm) | coefficient of variation of particle size (%) |
|---|---|---|---|---|---|---|
| Example 1 | 70 | 90,000 | 2.2 | 0.04 | 11.7 | 53.1 |
| Example 2 | 84 | 103,000 | 2.5 | 0.12 | 13.5 | 37.1 |
| Example 3 | 93 | 71,000 | 2.5 | 0.10 | 9.0 | 43.5 |
| Example 4 | 83 | 80,000 | 2.2 | 0.03 | 10.4 | 64.8 |
| Example 5 | 89 | 110,000 | 2.5 | 0.09 | 8.2 | 44.6 |
| Comparative Example 1 | 72 | — | — | — | 23.0 | 60.4 |
| Comparative Example 2 | 44 | — | — | — | 28.8 | 60.1 |

Comparative Example 2

Except that nickel chloride was used in place of the bis(2,4-pentanedionato) nickel used in Example 5, the same procedure as in Example 5 was carried out to obtain a brown solid containing a black aggregate. From an absorption spectrum in infrared spectroscopic analysis of the solid, the solid was confirmed to be a compound including phenylene sulfide units (PPS). A part of the solid, particularly the black aggregate, was insoluble in 1-chloronaphthalene at 250° C., Comparative Example 3

Here, synthesis based on the method for producing a polyphenylene sulfide resin composition including nickel fine particles as described in Japanese Patent Laid-open Publication No. 2010-275464 is described. The polyphenylene sulfide resin prepared in Reference Example 2 and nickel fine particles were kneaded by a melt kneading method under the following conditions using LABO PLAS-TOMILL (apparatus: Model 50C150 manufactured by Toyo Seiki Co., Ltd.) as a resin melt kneading apparatus. Into a kneading chamber heated to a temperature of 320° C. while a kneading blade was rotated at a mixer rotation number of 10 rpm were introduced 50.0 g of the polyphenylene sulfide resin powder in Reference Example 2 and 10.0 g of metal nickel nanoparticles (manufactured by JFE Mineral Co., Ltd.; NEP201; average primary particle size: 200 nm), which were dry-blended with each other. After the powder was completely introduced into the kneading chamber, a melt kneading treatment was performed for 10 minutes with the mixer rotation number increased to 150 rpm, i.e. the upper limit for the apparatus, and a nickel particle-containing polyphenylene sulfide resin composition was collected. The average particle size of nickel particles, which was calculated from a TEM image, was 500 nm. The results are shown in Table 2.

Comparative Example 4

Here, synthesis based on the method for producing a polyphenylene sulfide resin composition including nickel fine particles as described in Japanese Patent Laid-open Publication No. 2010-275464 is described. In a SUS316 vessel with an agitating blade, which had an internal volume of 1.5 L and to which a temperature sensor and nitrogen gas lines (one at each of inlet and outlet) were connected was added 800 g of N-methyl-2-pyrrolidone (NMP) as an organic solvent. Thereafter, 40.0 g of metal nickel nanoparticles (manufactured by JFE Mineral Co., Ltd.; NEP201; average primary particle size: 200 nm) and 200 g of the polyphenylene sulfide prepared in Reference Example 2 were added in the vessel, and the vessel was completely hermetically sealed. Thereafter, the nitrogen gas inlet and outlet were opened, a nitrogen gas was made to pass at a flow rate of 1 L/minute for 10 minutes to replace the air in the vessel, and the nitrogen gas inlet and outlet were then closed. The inside of the vessel was heated at 4° C./minute while being agitated at a rate of 300 rotations/minute, and was held for 30 minutes after the temperature reached 250° C. Thereafter, heating was stopped while agitating was continued, and the inside of the vessel was cooled at 4° C./minute. When the temperature decreased to 70° C., agitating was stopped, and the vessel was opened. The contents of the vessel were added in 2 L of ion exchanged water, and agitated at room temperature for 30 minutes to be dispersed and washed, and the resulting dispersion slurry was poured into a 90 mmϕ Nutsche from above a Hirsch funnel 5B filter paper laid over the Nutsche, and filtered under reduced pressure. The operation of dispersing and washing the resin composition on the filter paper with 2 L of ion exchanged water was further repeated twice, so that the washing filtration liquid became transparent. The thus collected resin composition on the filter paper was spread over a metal vat, and dried with hot air at 120° C. for 14 hours to collect a nickel particle-containing polyphenylene sulfide resin composition. The average particle size of nickel particles, which was calculated from a TEM image, was 220 nm. The results are shown in Table 2.

Comparative Example 5

Except that the cyclic polyphenylene sulfide obtained in Reference Example 1 was used, the same procedure as in Comparative Example 3 was carried out to obtain a black solid. The average particle size of nickel particles, which was calculated from a TEM image, was 350 nm. The results are shown in Table 2.

TABLE 2

| | Nickel compound species | Polyarylene sulfide species | Production method | Reaction or mixing temperature (° C.) | Reaction or mixing time (minutes) | Average particle size (nm) |
|---|---|---|---|---|---|---|
| Comparative Example 3 | Ni nanoparticles (average particle size: 200 nm) | Polyarylene sulfide (Reference Example 2) | Melt kneading | 320 | 10 | 500 |
| Comparative Example 4 | Ni nanoparticles (average particle size: 200 nm) | Polyarylene sulfide (Reference Example 2) | Solution mixing | 250 | 30 | 220 |
| Comparative Example 5 | Ni nanoparticles (average particle size: 200 nm) | Cyclic polyarylene sulfide (Reference Example 1) | Melt kneading | 320 | 10 | 350 |

The results from Examples 1 to 5 showed that a polyarylene sulfide resin composition easily and conveniently produced by heating cyclic polyphenylene sulfide in the presence of nickel formate dihydrate and nickel formate anhydride as the nickel carboxylate compound including nickel and a carboxylic acid structure represented by the general formula (A), bis(stearylamine)-nickel formate or bis(dodecylamine)-nickel formate as the nickel carboxylate-amine complex including a primary amine and a nickel carboxylate compound represented by the general formula (C), or bis(2,4-pentanedionato) nickel as the nickel compound represented by the general formula (D) was a polyarylene sulfide resin composition including nickel fine particles having an average particle size of 0.5 to 20 nm.

The results from Comparative Examples 1 and 2 showed that when cyclic polyphenylene sulfide was heated in the presence of a zero-valent nickel compound or a nickel compound that is a weak Lewis acid, a polyphenylene sulfide resin composition including nickel fine particles having an average particle size of 0.5 to 20 nm was not obtained.

The results from Comparative Examples 3 to 5 showed that in a method for producing a polyphenylene sulfide resin composition by melt kneading or solution mixing, aggregation of nickel particles occurred, leading to an increase in average particle size, and thus a polyphenylene sulfide resin composition including nickel fine particles having an average particle size of 0.5 to 20 nm was not obtained.

Example 6

Except that the amount of the powder obtained by mixing cyclic polyphenylene sulfide and nickel formate dihydrate, which was to be added in a glass ampoule, was changed to 5 g, and the heating time was changed to 60 minutes, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 91%. The result of GPC measurement showed that a peak originating from the cyclic polyphenylene sulfide and a peak from the generated polymer (PPS) existed, and the obtained PPS was found to have a weight average molecular weight of 92,000 and a polydispersity of 2.4. The result of measuring the weight loss ratio of the obtained product in heating showed that the weight loss ratio $\Delta Wr$ was 0.04%. Further, the TEM image of the obtained solid (size of observation object region: 1 μm×1 μm) was as shown in FIG. 8, and the nickel particles had an average particle size of 10.3 nm and a coefficient of variation of 48.0%. The tensile elongation was 30.8%. The results are shown in Table 3.

Example 7

Unopened bis(2,4-pentanedionato) nickel tightly sealed under an inert atmosphere was opened under a nitrogen atmosphere, and mixed with the cyclic polyphenylene sulfide obtained in Reference Example 1, the amount of the bis(2,4-pentanedionato) nickel being 1% by mole based on the amount of sulfur atoms in the cyclic polyphenylene sulfide. In a glass ampoule was added 300 mg of the mixed powder, and the inside of the ampoule was purged with nitrogen. The ampoule was placed in an electric furnace with the temperature adjusted to 300° C., the inside of the ampoule was heated for 60 minutes while being kept under a nitrogen atmosphere at normal pressure, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 90%. The result of GPC measurement showed that a peak originating from the cyclic polyphenylene sulfide and a peak from the generated polymer (PPS) existed, and the obtained PPS was found to have a weight average molecular weight of 86,000 and a polydispersity of 2.5. The result of measuring the weight loss ratio of the obtained product in heating showed that the weight loss ratio $\Delta Wr$ was 0.15%. Further, the TEM image of the obtained solid (size of observation object region: 1 μm×1 μm) was as shown in FIG. 9, and the nickel particles had an average particle size of 11.3 nm and a coefficient of variation of 45.5%. The results are shown in Table 3.

Example 8

Except that bis(2,4-pentanedionato) nickel dihydrate was used in place of the bis(2,4-pentanedionato) nickel used in Example 7, the same procedure as in Example 7 was carried out to obtain a black solid. From an absorption spectrum in infrared spectroscopic analysis of the solid, the solid was confirmed to be a compound including phenylene sulfide units (PPS). Apart of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 87%. The result of GPC measurement showed that a peak originating from the cyclic polyphenylene sulfide and a peak from the generated polymer (PPS) existed, and the obtained PPS was found to have a weight average molecular weight of 90,000 and a polydispersity of 2.4. The result of measuring the weight loss ratio of the obtained product in heating showed that the weight loss ratio $\Delta Wr$ was 0.12%. Further, the TEM image of the obtained solid (size of observation object region: 1 μm×1 μm) was as shown in FIG. 10, and the nickel particles had an average particle size of 8.3 nm and a coefficient of variation of 21.0%. The results are shown in Table 3.

Comparative Example 6

In a glass ampoule was added 300 mg of the cyclic polyphenylene sulfide obtained in the Reference Example 1, and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 300° C., the inside of the ampoule was heated for 60 minutes while being kept at a pressure of about 0.4 kPa and degassed by a vacuum pump, and the ampoule was then taken out, and cooled to room temperature to obtain a brown solid. From an absorption spectrum in infrared spectroscopic analysis of the solid, the solid was confirmed to be a compound including phenylene sulfide units (PPS). The solid was fully dissolved in 1-chloronaphthalene at 250° C. The result of HPLC measurement showed that the conversion of the cyclic polyphenylene sulfide to the PPS was 35%. The results are shown in Table 3.

Comparative Example 7

In a glass ampoule was added 300 mg of the cyclic polyphenylene sulfide obtained in the Reference Example 1, and the inside of the ampoule was purged with nitrogen. The ampoule was placed in an electric furnace with the temperature adjusted to 300° C., the inside of the ampoule was heated for 60 minutes while being kept under a nitrogen atmosphere at normal pressure, and the ampoule was then taken out, and cooled to room temperature to obtain a brown solid. From an absorption spectrum in infrared spectroscopic analysis of the solid, the solid was confirmed to be a compound including phenylene sulfide units (PPS). The solid was fully dissolved in 1-chloronaphthalene at 250° C. The result of HPLC measurement showed that the conversion of the cyclic polyphenylene sulfide to the PPS was 37%. The results are shown in Table 3.

Comparative Example 8

Except that unopened bis(1,5-cyclooctadiene) nickel (described as Ni(cod)$_2$ in the table; the same hereinafter) tightly sealed under an inert atmosphere was used in place of the bis(2,4-pentanedionato) nickel used in Example 5, the same procedure as in Example 5 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 78%. The results are shown in Table 3.

Comparative Example 9

Except that unopened bis(1,5-cyclooctadiene) nickel tightly sealed under an inert atmosphere was used in place of the bis(2,4-pentanedionato) nickel used in Example 7, the same procedure as in Example 7 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 58%. The results are shown in Table 3.

Comparative Example 10

Except that the amount of cyclic polyphenylene sulfide to be added in a glass ampoule was changed to 5 g, the heating temperature was changed to 340° C., and the heating time was changed to 120 minutes, the same procedure as in Comparative Example 6 was carried out to obtain a brown solid. From an absorption spectrum in infrared spectroscopic analysis of the solid, the solid was confirmed to be a compound including phenylene sulfide units (PPS). The solid was fully dissolved in 1-chloronaphthalene at 250° C. The result of HPLC measurement showed that the conversion of the cyclic polyphenylene sulfide to the PPS was 95%. The result of GPC measurement showed that a peak originating from the cyclic polyphenylene sulfide and a peak from the generated polymer (PPS) existed, and the obtained PPS was found to have a weight average molecular weight of 102,000 and a polydispersity of 2.4. The tensile elongation was 23.0%. The results are shown in Table 3.

Comparative Example 11

Metal nickel nanoparticles (average primary particle size: 100 nm) were mixed under a nitrogen atmosphere with the cyclic polyphenylene sulfide obtained in Reference Example 1, the amount of the metal nickel nanoparticles being 1% by mole based on the amount of sulfur atoms in the cyclic polyphenylene sulfide, 5 g of the mixed powder was added in a glass ampoule, and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 340° C., the inside of the ampoule was heated for 180 minutes while being kept at a pressure of about 0.4 kPa and degassed by a vacuum pump, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 94%. The result of GPC measurement showed that a peak originating from the cyclic polyphenylene sulfide and a peak from the generated polymer (PPS) existed, and the obtained PPS was found to have a weight average molecular weight of 107,000 and a polydispersity of 2.3. Further, the TEM image of the obtained solid observed at a magnification of 2,000 so that it would be able to extract 100 or more particles (size of observation object region: 1 μm×1 μm) was as shown in FIG. 11, and the nickel particles had an average particle size of 110.3 nm and a coefficient of variation of 53.1%. The tensile elongation was 22.3%. The results are shown in Table 3.

TABLE 3

| | Nickel compound species | Amount of catalyst (mol %) | Temperature (° C.) | Time (minutes) | Degassing | |
|---|---|---|---|---|---|---|
| Example 6 | Ni(HCOO)$_2$•2H$_2$O | 1 | 300 | 60 | Done | Continuous decompression (0.4 kPa) |
| Example 5 | Ni(acac)$_2$ | 1 | 300 | 60 | Done | Continuous decompression (0.4 kPa) |
| Example 7 | Ni(acac)$_2$ | 1 | 300 | 60 | Not done | Nitrogen atmosphere (normal pressure) |
| Example 8 | Ni(acac)$_2$•2H$_2$O | 1 | 300 | 60 | Not done | Nitrogen atmosphere (normal pressure) |
| Comparative Example 6 | — | — | 300 | 60 | Done | Continuous decompression (0.4 kPa) |
| Comparative Example 7 | — | — | 300 | 60 | Not done | Nitrogen atmosphere (normal pressure) |
| Comparative Example 8 | Ni(cod)$_2$ | 1 | 300 | 60 | Done | Continuous decompression (0.4 kPa) |
| Comparative Example 9 | Ni(cod)$_2$ | 1 | 300 | 60 | Not done | Nitrogen atmosphere (normal pressure) |
| Comparative Example 10 | — | — | 340 | 120 | Done | Continuous decompression (0.4 kPa) |

TABLE 3-continued

| | | | | | | |
|---|---|---|---|---|---|---|
| Comparative Example 11 | Ni nanoparticles (average particle size: 100 nm) | 1 | 340 | 180 | Done | Continuous decompression (0.4 kPa) |

| | Conversion (%) | Mw | Mw/Mn | ΔWr (%) | Average particle size (nm) | coefficient of variation of particle size (%) | Tensile elongation (%) |
|---|---|---|---|---|---|---|---|
| Example 6 | 91 | 92,000 | 2.4 | 0.04 | 10.3 | 48.0 | 30.8 |
| Example 5 | 89 | 110,000 | 2.5 | 0.09 | 8.2 | 44.6 | — |
| Example 7 | 90 | 86,000 | 2.5 | 0.15 | 11.3 | 45.5 | — |
| Example 8 | 87 | 90,000 | 2.4 | 0.12 | 8.3 | 21.0 | — |
| Comparative Example 6 | 35 | — | — | — | — | — | — |
| Comparative Example 7 | 37 | — | — | — | — | — | — |
| Comparative Example 8 | 78 | — | — | — | — | — | — |
| Comparative Example 9 | 58 | — | — | — | — | — | — |
| Comparative Example 10 | 95 | 102,000 | 2.4 | 0.03 | — | — | 23.0 |
| Comparative Example 11 | 94 | 107,000 | 2.3 | 0.10 | 110.3 | 53.1 | 22.3 |

Comparison between the results from Examples 5 to 8 and the results from Comparative Examples 6 and 7 showed that when cyclic polyphenylene sulfide was heated in the presence of nickel formate dihydrate as the nickel carboxylate compound including nickel and a carboxylic acid structure represented by the general formula (A), or bis(2,4-pentanedionato) nickel (anhydride or dihydrate) as the nickel compound represented by the general formula (D), the cyclic polyphenylene sulfide was converted to polyphenylene sulfide in a shorter time.

Comparison between the results from Examples 5 and 6 and the results from Comparative Example 8 showed that in the case where bis(2,4-pentanedionato) nickel as the nickel compound represented by the general formula (D) was used, it was able to convert cyclic polyphenylene sulfide to polyphenylene sulfide in a shorter time as compared to the case where bis(1,5-cyclooctadiene) nickel that is a zerovalent transition metal compound was used.

Comparison between Example 5 and Example 7 showed that the effect of accelerating conversion of cyclic polyphenylene sulfide to polyphenylene sulfide by bis(2,4-pentanedionato) nickel as the nickel compound represented by the general formula (D) under a degassing condition was comparable to that under a nitrogen atmosphere at normal pressure.

On the other hand, comparison between Comparative Example 8 and Comparative Example 9 showed that in the case where bis(1,5-cyclooctadiene) nickel that is a zerovalent transition metal compound was added, the effect of accelerating conversion of cyclic polyphenylene sulfide to polyphenylene sulfide was lower under a nitrogen atmosphere at normal pressure than under a degassing condition.

Comparison among Example 6 and Comparative Examples 10 and 11 showed that the tensile elongation of a film formed by using the polyarylene sulfide resin composition according to the present invention (Example 6) was superior to the tensile elongation of each of films formed by using the polyarylene sulfide resin composition of Comparative Example 10 and 11, and the tensile elongation of a film formed by using a polyarylene sulfide resin composition including coarse nickel particles (Comparative Example 11) was comparable to the tensile elongation of a film formed by using a polyarylene sulfide resin having no nickel compound (Comparative Example 10).

Example 9

Nickel formate dihydrate stored under a nitrogen atmosphere was mixed under a nitrogen atmosphere with the cyclic polyphenylene sulfide obtained in Reference Example 1, the amount of the nickel formate dihydrate being 1% by mole based on the amount of sulfur atoms in the cyclic polyphenylene sulfide, 300 mg of the mixed powder was added in a glass ampoule, and the inside of the ampoule was purged with nitrogen. The ampoule was placed in an electric furnace with the temperature adjusted to 300° C., the inside of the ampoule was heated for 10 minutes while being kept under a nitrogen atmosphere at normal pressure, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 38%. The results are shown in Table 4.

Example 10

Except that the bis(octylamine)-nickel formate in Reference Example 6 was used in place of the nickel formate dihydrate used in Example 1, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 81%. The result of GPC measurement showed that a peak originating from the cyclic polyphenylene sulfide and a peak from the generated polymer (PPS) existed, and the obtained PPS was found to have a weight average molecular weight of 81,000 and a polydispersity of 2.1. The result of measuring the weight loss ratio of the obtained product in heating showed that the weight loss ratio $\Delta Wr$ was 0.03%. The results are shown in Table 4.

Example 11

Except that unopened bis(2,4-pentanedionato) nickel (described as Ni(acac)$_2$ in the table; the same hereinafter) tightly sealed under an inert atmosphere was used in place of the nickel formate dihydrate used in Example 1, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 64%. The results are shown in Table 4.

Example 12

Except that unopened bis(2,4-pentanedionato) nickel tightly sealed under an inert atmosphere was used in place of the nickel formate dihydrate used in Example 9, the same procedure as in Example 9 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 61%. The results are shown in Table 4.

Comparative Example 12

Except that the heating time was changed to 10 minutes, the same procedure as in Comparative Example 6 was carried out to obtain a brown solid. From an absorption spectrum in infrared spectroscopic analysis of the solid, the solid was confirmed to be a compound including phenylene sulfide units (PPS). The solid was fully dissolved in 1-chloronaphthalene at 250° C. The result of HPLC measurement showed that the conversion of the cyclic polyphenylene sulfide to the PPS was 11%. The results are shown in Table 4.

Comparative Example 13

Except that the heating time was changed to 10 minutes, the same procedure as in Comparative Example 7 was carried out to obtain a brown solid. From an absorption spectrum in infrared spectroscopic analysis of the solid, the solid was confirmed to be a compound including phenylene sulfide units (PPS). The solid was fully dissolved in 1-chloronaphthalene at 250° C. The result of HPLC measurement showed that the conversion of the cyclic polyphenylene sulfide to the PPS was 12%. The results are shown in Table 4.

Comparative Example 14

Except that unopened nickel oxide tightly sealed under an inert atmosphere was used in place of the nickel formate dihydrate used in Example 1, the same procedure as in Example 1 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 8%. The results are shown in Table 4.

TABLE 4

| | Nickel compound species | Amount of catalyst (mol %) | Temperature (° C.) | Time (minutes) | | Degassing | Conversion (%) |
|---|---|---|---|---|---|---|---|
| Example 1 | Ni(HCOO)$_2$·2H$_2$O | 1 | 300 | 10 | Done | Continuous decompression (0.4 kPa) | 70 |
| Example 9 | Ni(HCOO)$_2$·2H$_2$O | 1 | 300 | 10 | Not done | Nitrogen atmosphere (normal pressure) | 38 |
| Example 2 | Ni(HCOO)$_2$ | 1 | 300 | 10 | Done | Continuous decompression (0.4 kPa) | 84 |
| Example 3 | Ni(HCOO)$_2$·2CH$_3$(CH$_2$)$_{17}$NH$_2$ | 1 | 300 | 10 | Done | Continuous decompression (0.4 kPa) | 93 |
| Example 4 | Ni(HCOO)$_2$·2CH$_3$(CH2)$_{11}$NH$_2$ | 1 | 300 | 10 | Done | Continuous decompression (0.4 kPa) | 83 |
| Example 10 | Ni(HCOO)$_2$·2CH$_3$(CH$_2$)$_7$NH$_2$ | 1 | 300 | 10 | Done | Continuous decompression (0.4 kPa) | 81 |
| Example 11 | Ni(acac)$_2$ | 1 | 300 | 10 | Done | Continuous decompression (0.4 kPa) | 64 |
| Example 12 | Ni(acac)$_2$ | 1 | 300 | 10 | Not done | Nitrogen atmosphere (normal pressure) | 61 |
| Comparative Example 12 | — | — | 300 | 10 | Done | Continuous decompression (0.4 kPa) | 11 |
| Comparative Example 13 | — | — | 300 | 10 | Not done | Nitrogen atmosphere (normal pressure) | 12 |
| Comparative Example 14 | NiO | 1 | 300 | 10 | Done | Continuous decompression (0.4 kPa) | 8 |

Comparison between the results from Examples 1, 2, 3, 4, 9, 10, 11 and 12 and the results from Comparative Examples 12 and 13 showed that when cyclic polyphenylene sulfide was heated in the presence of nickel formate dihydrate and nickel formate anhydride as the nickel carboxylate compound including nickel and a carboxylic acid structure represented by the general formula (A), bis(stearylamine)-nickel formate, bis(dodecylamine)-nickel formate or bis(octylamine)-nickel formate as the nickel carboxylate-amine complex including a primary amine and a nickel carboxylate compound represented by the general formula (C), or bis(2,4-pentanedionato) nickel as the nickel compound represented by the general formula (D), the cyclic polyphenylene sulfide was converted to polyphenylene sulfide in a shorter time.

Comparison between Example 1 and Example 9 showed that when cyclic polyphenylene sulfide was heated under a degassing condition at the time of heating the cyclic polyphenylene sulfide in the presence of nickel formate dihydrate as the nickel carboxylate compound including nickel and a carboxylic acid structure represented by the general formula (A), the cyclic polyphenylene sulfide was converted to polyphenylene sulfide in a shorter time.

Comparison between Example 1 and Example 2 showed that in the case where among nickel formates as the nickel carboxylate compound including nickel and a carboxylic acid structure represented by the general formula (A), nickel formate anhydride was used, the cyclic polyphenylene sulfide was converted to polyphenylene sulfide in a shorter time as compared to the case where nickel formate dihydrate was used.

Comparison among Examples 1 to 4 showed that in the case where bis(stearylamine)-nickel formate, bis(dodecylamine)-nickel formate or bis(octylamine)-nickel formate as the nickel carboxylate-amine complex including a primary amine and a nickel carboxylate compound represented by the general formula (C), and nickel formate anhydride as the nickel carboxylate compound including nickel and a carboxylic acid structure represented by the general formula (A) were used, cyclic polyphenylene sulfide was converted to polyphenylene sulfide in a shorter time as compared to the case where nickel formate dihydrate as the nickel carboxylate compound including nickel and a carboxylic acid structure represented by the general formula (A) was used.

Comparison between Example 11 and Example 12 showed that the effect of accelerating conversion of cyclic polyphenylene sulfide to polyphenylene sulfide by bis(2,4-pentanedionato) nickel as the nickel compound represented by the general formula (D) under a degassing condition was comparable to that under a nitrogen atmosphere at normal pressure.

Comparison between Comparative Example 14 and Comparative Example 12 showed that when cyclic polyphenylene sulfide was heated in the presence of nickel oxide as a nickel compound other than the compounds (i), (ii) and (iii), conversion of the cyclic polyphenylene sulfide to polyphenylene sulfide was not accelerated.

Example 13

Nickel formate dihydrate stored under the air for 2 months was mixed under the air with the cyclic polyphenylene sulfide obtained in Reference Example 1, the amount of the nickel formate dihydrate being 1% by mole based on the amount of sulfur atoms in the cyclic polyphenylene sulfide, 300 mg of the mixed powder was added in a glass ampoule, and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 300° C., the inside of the ampoule was heated for 60 minutes while being kept at a pressure of about 0.4 kPa and degassed by a vacuum pump, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 91%. The results are shown in Table 5.

Example 14

Bis(2,4-pentanedionato) nickel stored under the air for 2 months was mixed under the air with the cyclic polyphenylene sulfide obtained in Reference Example 1, the amount of the bis(2,4-pentanedionato) nickel being 1% by mole based on the amount of sulfur atoms in the cyclic polyphenylene sulfide, 300 mg of the mixed powder was added in a glass ampoule, and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 300° C., the inside of the ampoule was heated for 10 minutes while being kept at a pressure of about 0.4 kPa and degassed by a vacuum pump, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 60%. The results are shown in Table 5.

Example 15

Bis(2,4-pentanedionato) nickel stored under the air for 2 months was mixed under the air with the cyclic polyphenylene sulfide obtained in Reference Example 1, the amount of the bis(2,4-pentanedionato) nickel being 1% by mole based on the amount of sulfur atoms in the cyclic polyphenylene sulfide, and 300 mg of the mixed powder was added in a glass ampoule and the inside of the ampoule was purged with nitrogen. The ampoule was placed in an electric furnace with the temperature adjusted to 300° C., the inside of the ampoule was heated for 10 minutes while being kept under a nitrogen atmosphere at normal pressure, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 58%. The results are shown in Table 5.

Comparative Example 15

Bis(1,5-cyclooctadiene) nickel stored under a nitrogen atmosphere for 2 months was mixed under a nitrogen atmosphere with the cyclic polyphenylene sulfide obtained in Reference Example 1, the amount of the bis(1,5-cyclooctadiene) nickel being 1% by mole based on the amount of sulfur atoms in the cyclic polyphenylene sulfide, 300 mg of the mixed powder was added in a glass ampoule, and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 300° C., the inside of the ampoule was heated for 60 minutes while being kept at a pressure of about 0.4 kPa and degassed by a vacuum pump, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid Was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 62%. The results are shown in Table 5.

Comparative Example 16

Except that the heating time was changed to 10 minutes, the same procedure as in Comparative Example 8 was carried out to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 49%. The results are shown in Table 5.

Comparative Example 17

Bis(1,5-cyclooctadiene) nickel stored under a nitrogen atmosphere for 2 months was mixed under a nitrogen atmosphere with the cyclic polyphenylene sulfide obtained in Reference Example 1, the amount of the bis(1,5-cyclooctadiene) nickel being 1% by mole based on the amount of sulfur atoms in the cyclic polyphenylene sulfide, 300 mg of the mixed powder was added in a glass ampoule, and the inside of the ampoule was purged with nitrogen, and then decompressed to about 0.4 kPa using a vacuum pump. About 10 seconds after the decompression to about 0.4 kPa, the ampoule was placed in an electric furnace with the temperature adjusted to 300° C., the inside of the ampoule was heated for 10 minutes while being kept at a pressure of about 0.4 kPa and degassed by a vacuum pump, and the ampoule was then taken out, and cooled to room temperature to obtain a black solid. From an absorption spectrum in infrared spectroscopic analysis of the solid, the solid was confirmed to be a compound including phenylene sulfide units (PPS). A part of the solid was insoluble in 1-chloronaphthalene at 250° C., but the insoluble part was found to be a nickel compound rather than a compound including a phenylene sulfide structure, and the generated PPS component was soluble. The result of HPLC measurement showed that the conversion of the cyclic polyphenylene sulfide to the PPS was 21%. The results are shown in Table 5.

TABLE 5

| | Nickel compound species | Catalyst storage state | Amount of catalyst (mol %) | addition of catalyst | Temperature (° C.) | Time (minutes) | Degassing | Conversion (%) |
|---|---|---|---|---|---|---|---|---|
| Example 6 | Ni(HCOO)$_2$·2H$_2$O | Under nitrogen atmosphere | 1 | Under nitrogen atmosphere | 300 | 60 | Done | Continuous decompression (0.4 kPa) | 91 |
| Example 13 | Ni(HCOO)$_2$·2H$_2$O | Under air (2 months) | 1 | Under air | 300 | 60 | Done | Continuous decompression (0.4 kPa) | 91 |
| Comparative Example 8 | Ni(cod)$_2$ | Immediately after reagent is opened | 1 | Under nitrogen atmosphere | 300 | 60 | Done | Continuous decompression (0.4 kPa) | 78 |
| Comparative Example 15 | Ni(cod)$_2$ | Under nitrogen atmosphere (2 months) | 1 | Under nitrogen atmosphere | 300 | 60 | Done | Continuous decompression (0.4 kPa) | 62 |
| Example 11 | Ni(acac)$_2$ | Immediately after reagent is opened | 1 | Under nitrogen atmosphere | 300 | 10 | Done | Continuous decompression (0.4 kPa) | 64 |
| Example 14 | Ni(acac)$_2$ | Under air (2 months) | 1 | Under air | 300 | 10 | Done | Continuous decompression (0.4 kPa) | 60 |
| Example 12 | Ni(acac)$_2$ | Immediately after reagent is opened | 1 | Under nitrogen atmosphere | 300 | 10 | Not done | Nitrogen atmosphere (normal pressure) | 61 |
| Example 15 | Ni(acac)$_2$ | Under air (2 months) | 1 | Under air | 300 | 10 | Not done | Nitrogen atmosphere (normal pressure) | 58 |

| | Nickel compound species | Catalyst storage state | Amount of catalyst addition of (mol %) | Catalyst addition of | Temperature (° C.) | Time (minutes) | Degassing | Conversion (%) |
|---|---|---|---|---|---|---|---|---|
| Comparative Example 16 | Ni(cod)$_2$ | Immediately after reagent is opened | 1 | Under nitrogen atmosphere | 300 | 10 | Done | Continuous decompression (0.4 kPa) | 49 |
| Comparative Example 17 | Ni(cod)$_2$ | Under nitrogen atmosphere (2 months) | 1 | Under nitrogen atmosphere | 300 | 10 | Done | Continuous decompression (0.4 kPa) | 21 |

Comparison between Example 6 and Example 13 showed that nickel formate dihydrate as the nickel carboxylate compound including nickel and a carboxylic acid structure represented by the general formula (A) retained the effect of accelerating conversion of cyclic polyphenylene sulfide to polyphenylene sulfide either when stored under the air or when added to the cyclic polyphenylene sulfide under the air, and thus the nickel formate dihydrate had high stability and was excellent in handling characteristics.

Comparison between Comparative Example 8 and Comparative Example 15 showed that bis(1,5-cyclooctadiene) nickel that is a zero-valent transition metal compound tended to have a reduced effect of accelerating conversion of cyclic polyphenylene sulfide to polyphenylene sulfide even when stored under nitrogen atmosphere (oxygen concentration: 1% by volume or less), and thus the bis(1,5-cyclooctadiene) nickel had low stability.

Comparison between Example 11 and Example 14 and comparison between Example 12 and Example 15 showed that bis(2,4-pentanedionato) nickel as the nickel compound represented by the general formula (D) almost completely retained the effect of accelerating conversion of cyclic polyphenylene sulfide to polyphenylene sulfide either when stored under the air or when added to the cyclic polyphenylene sulfide under the air, and thus the bis(2,4-pentanedionato) nickel had high stability and was excellent in handling characteristics.

Comparison between Comparative Example 16 and Comparative Example 17 showed that bis(1,5-cyclooctadiene) nickel that is a zero-valent transition metal compound tended to have a reduced effect of accelerating conversion of cyclic polyphenylene sulfide to polyphenylene sulfide even when stored under nitrogen atmosphere (oxygen concentration: 1% by volume or less), and thus the bis(1,5-cyclooctadiene) nickel had low stability.

The invention claimed is:

1. A method for producing a polyarylene sulfide resin composition, the method comprising heating a cyclic polyarylene sulfide in the presence of at least one selected from the group consisting of (i), (ii) and (iii):
   (i) a nickel carboxylate compound including nickel, and a carboxylic acid structure represented by the general formula (A):

[Chemical Formula 1]

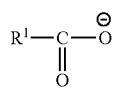

(A)

-continued

(B)

wherein R$^1$ represents hydrogen, or a substituent selected from the group consisting of an aryl group with a carbon number of 6 to 24, an alkenyl group with a carbon number of 1 to 12, an alkynyl group with a carbon number of 1 to 12, and a structure (substituent) represented by the formula (B), where hydrogen of each of the substituents may be substituted with an alkyl group with a carbon number of 1 to 12, and in the formula (B), k represents an integer of 0 to 6, m represents an integer of 0 or 1, and n represents an integer of 0 to 6;

(ii) a nickel carboxylate-amine complex including a primary amine and a nickel carboxylate compound represented by the general formula (C):

[Chemical Formula 2]

Ni(R$^2$COO)(R$^3$COO)     (C)

wherein R$^2$ and R$^3$ each represent hydrogen or a hydrocarbon group with a carbon number of 1 to 12, where R$^2$ and R$^3$ may be the same or mutually different; and (iii) a nickel compound represented by the general formula (D):

[Chemical Formula 3]

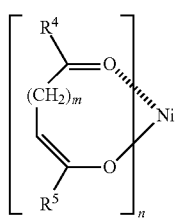

(D)

wherein m represents an integer of 0 to 10, n represents an integer of 1 to 3, and R$^4$ and R$^5$ each represent a substituent selected from the group consisting of an alkyl group with a carbon number of 1 to 12, an alkoxy group with a carbon number of 1 to 12, an aryl group with a carbon number of 6 to 24, and a halogen group, where the hydrogen atom of each of the alkyl group, the alkoxy group and the aryl group may be substituted with a halogen atom, and R$^4$ and R$^5$ may be the same or mutually different.

2. The method for producing a polyarylene sulfide resin composition according to claim 1, wherein the cyclic polyarylene sulfide is heated in the presence of the nickel carboxylate compound of (i) in which $R^1$ is hydrogen, or a substituent selected from structures where m is 0 in the structure represented by the formula (B).

3. The method for producing a polyarylene sulfide resin composition according to claim 1, wherein the cyclic polyarylene sulfide is heated in the presence of the nickel carboxylate compound of (i) in which $R^1$ is hydrogen, or a substituent selected from structures where k and n are 0 in the structure represented by the formula (B).

4. The method for producing a polyarylene sulfide resin composition according to claim 1, wherein the cyclic polyarylene sulfide is heated in the presence of nickel formate.

5. The method for producing a polyarylene sulfide resin composition according to claim 1, wherein the cyclic polyarylene sulfide is heated in the presence of the nickel carboxylate-amine complex of (ii) in which $R^2$ is hydrogen or a hydrocarbon group with a carbon number of 1 to 8.

6. The method for producing a polyarylene sulfide resin composition according to claim 1, wherein the cyclic polyarylene sulfide is heated in the presence of the nickel carboxylate-amine complex of (ii) in which the primary amine is an aliphatic amine.

7. The method for producing polyarylene sulfide resin composition according to claim 1, wherein the heating is performed under degassing conditions.

8. The method for producing a polyarylene sulfide resin composition according to claim 1, wherein the cyclic polyarylene sulfide is heated in the presence of the nickel compound of (iii) in which $R^4$ is a substituent selected from the group consisting of an alkyl group with a carbon number of 1 to 12, an alkoxy group with a carbon number of 1 to 12, and an aryl group with a carbon number of 6 to 24, and $R^5$ is a substituent selected from the group consisting of an alkyl group with a carbon number of 1 to 12, an alkoxy group with a carbon number of 1 to 12, and an aryl group with a carbon number of 6 to 24, where the hydrogen atom of each of the alkyl group, the alkoxy group and the aryl group may be substituted with a halogen atom, and $R^4$ and $R^5$ may be the same or mutually different.

9. The method for producing a polyarylene sulfide resin composition according to claim 1, wherein the cyclic polyarylene sulfide is heated in the presence of the nickel compound of (iii) in which $R^4$ and $R^5$ are each a methyl group.

10. The method for producing a polyarylene sulfide resin composition according to claim 1, wherein the cyclic polyarylene sulfide is heated in the presence of the nickel compound of (iii) in which m is 0.

11. The method for producing a polyarylene sulfide resin composition according to claim 1, wherein the resulting polyarylene sulfide resin composition includes nickel fine particles, and the average particle size of the nickel fine particles is 0.5 to 20 nm.

12. The method for producing a polyarylene sulfide resin composition according to claim 1, wherein the heating is performed under a substantially solvent-free condition.

* * * * *